US012542206B2

(12) United States Patent
Tashiro

(10) Patent No.: US 12,542,206 B2
(45) Date of Patent: Feb. 3, 2026

(54) MEDICAL SUPPORT DEVICE, MEDICAL IMAGE CAPTURING SYSTEM, MEDICAL SUPPORT METHOD, AND PROGRAM

(71) Applicant: FUJIFILM CORPORATION, Tokyo (JP)

(72) Inventor: Rika Tashiro, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/823,476

(22) Filed: Sep. 3, 2024

(65) Prior Publication Data

US 2025/0111931 A1 Apr. 3, 2025

(30) Foreign Application Priority Data

Sep. 28, 2023 (JP) ................ 2023-168675

(51) Int. Cl.
*A61B 8/00* (2006.01)
*A61B 6/00* (2024.01)
*A61B 6/04* (2006.01)
*A61B 6/46* (2024.01)
*A61B 6/50* (2024.01)
*A61B 8/08* (2006.01)
*G16H 30/40* (2018.01)

(52) U.S. Cl.
CPC .......... *G16H 30/40* (2018.01); *A61B 6/0414* (2013.01); *A61B 6/4417* (2013.01); *A61B 6/463* (2013.01); *A61B 6/502* (2013.01); *A61B 6/5247* (2013.01); *A61B 8/0825* (2013.01); *A61B 8/403* (2013.01); *A61B 8/4416* (2013.01); *A61B 8/463* (2013.01); *A61B 8/5261* (2013.01)

(58) Field of Classification Search
CPC ..... A61B 6/502; A61B 6/0414; A61B 8/0825; A61B 8/403
See application file for complete search history.

(56) References Cited

U.S. PATENT DOCUMENTS 12,383,232 B2 * 8/2025 Koshino .............. A61B 8/0825
2012/0150034 A1 6/2012 Defreitas et al.
(Continued)

FOREIGN PATENT DOCUMENTS

JP 2014-504918 A 2/2014
JP 2019-058606 A 4/2019
(Continued)

*Primary Examiner* — Colin T. Sakamoto
(74) *Attorney, Agent, or Firm* — SOLARIS Intellectual Property Group, PLLC

(57) ABSTRACT

A medical support device includes a processor configured to: acquire an examination image including a radiation image obtained by performing radiographic imaging of a breast in a state of being compressed by a compression member and a plurality of ultrasound images captured in a state in which the breast is compressed by the compression member, and that displays a position of a virtual cross section on each of the ultrasound image and the radiation image, and a schema image including a first schema image as an image that shows a first schema as a schematic view showing the breast in the radiographic imaging and that displays a position of the virtual cross section based on the ultrasound image; and execute display control of displaying a display image including the examination image and the schema image.

18 Claims, 21 Drawing Sheets

(56) References Cited

U.S. PATENT DOCUMENTS

| | | | |
|---|---|---|---|
| 2012/0256920 A1 | 10/2012 | Marshall et al. | |
| 2018/0249985 A1 | 9/2018 | Defreitas et al. | |
| 2019/0090833 A1 | 3/2019 | Koike | |
| 2020/0352543 A1 | 11/2020 | Defreitas et al. | |
| 2021/0052247 A1* | 2/2021 | Kobayashi | A61B 6/502 |
| 2023/0225708 A1* | 7/2023 | Koshino | A61B 8/0825 |
| | | | 600/437 |
| 2023/0253083 A1* | 8/2023 | Shibuya | G16H 15/00 |
| | | | 382/128 |
| 2023/0355203 A1 | 11/2023 | Defreitas et al. | |
| 2023/0414203 A1* | 12/2023 | Koshino | A61B 8/085 |
| 2024/0298991 A1* | 9/2024 | Sugahara | A61B 6/469 |
| 2024/0324979 A1* | 10/2024 | Miyachi | A61B 8/461 |

FOREIGN PATENT DOCUMENTS

| | | | |
|---|---|---|---|
| JP | 2022-162969 A | 10/2022 | |
| JP | 2023-099261 A | 7/2023 | |
| JP | 7672892 B2 * | 5/2025 | A61B 8/5223 |

* cited by examiner

MEDICAL SUPPORT DEVICE, MEDICAL IMAGE CAPTURING SYSTEM, MEDICAL SUPPORT METHOD, AND PROGRAM

CROSS-REFERENCE TO RELATED APPLICATIONS

This application is based on and claims priority under 35 USC 119 from Japanese Patent Application No. 2023-168675, filed Sep. 28, 2023, the disclosure of which is incorporated herein by reference in its entirety.

TECHNICAL FIELD

The present disclosure relates to a medical support device, a medical image capturing system, a medical support method, and a computer-readable storage medium storing a program.

RELATED ART

JP2023-099261A discloses a medical information provision apparatus comprising: a display position calculation unit that acquires first image information regarding a subject imaged by a first medical image diagnostic device, acquires second image information regarding the subject imaged by a second medical image diagnostic device prior to the first medical image diagnostic device, and shares position information of the first image information and the second image information with each other in a first image and a second image, to perform operation such that registration processing between the first image and the second image can be performed; and a display controller that displays position information of the second image calculated by the display position calculation unit by reflecting the position information of the second image in display of the first image.

In an examination of a breast of a subject, there may be two types of examinations, which are a radiographic examination of irradiating the breast with radiation to acquire a radiation image and an ultrasound examination of acquiring an echo image of the breast using an ultrasound probe. In this case, the interpretation of the examination image may be performed by comparing a plurality of examination images. Further, in a case of the interpretation, a schema which is a schematic view showing the breast may be used to perform a comparison between the schema and the examination image. For example, in a case in which a position of a lesion is specified as a result of the interpretation, the position of the lesion is entered in the schema. In this way, in a case in which the interpretation is performed while comparing the plurality of examination images with the schema, it is required to facilitate the association between the examination image and the schema image.

SUMMARY

The technology of the present disclosure provides a medical support device, a medical image capturing system, a medical support method, and a computer-readable storage medium storing a program that facilitate association between an examination image and a schema image.

A first aspect according to the technology of the present disclosure relates to a medical support device comprising: a processor, in which the processor is configured to: acquire an examination image that is an image including a radiation image obtained by performing radiographic imaging of a breast in a state of being compressed by a compression member and a plurality of ultrasound images captured in a state in which the breast is compressed by the compression member in a compressed state regarded as being the same as a compressed state in the radiation image, and that displays a position of a virtual cross section on each of the ultrasound image and the radiation image, and a schema image including a first schema image as an image that shows a first schema as a schematic view showing the breast in the radiographic imaging and that displays a position of the virtual cross section based on the ultrasound image; and execute display control of displaying a display image including the examination image and the schema image.

A second aspect according to the technology of the present disclosure relates to the medical support device according to the first aspect, in which the schema image further includes a second schema image, and the second schema image is an image that shows a second schema as a schematic view corresponding to an ultrasound examination image of an examination method performed by placing a probe on the breast and that displays a position of the virtual cross section.

A third aspect according to the technology of the present disclosure relates to the medical support device according to the second aspect, in which, in a case in which a region of interest is designated on at least any one of the ultrasound image or the radiation image, the region of interest is displayed at a corresponding position in both the first schema image and the second schema image.

A fourth aspect according to the technology of the present disclosure relates to the medical support device according to the second aspect, in which the position of the virtual cross section on the second schema image is derived based on the position of the virtual cross section on the first schema and a depth of the virtual cross section in a compression direction in the ultrasound image.

A fifth aspect according to the technology of the present disclosure relates to the medical support device according to the second aspect, in which the schema image further includes a third schema image, and the third schema image is an image that shows a third schema as a schematic view of the breast in the radiographic imaging in which an imaging direction is different from an imaging direction in a case of the first schema and that displays a position of the virtual cross section.

A sixth aspect according to the technology of the present disclosure relates to the medical support device according to the fifth aspect, in which the position of the virtual cross section on the third schema image is derived based on the position of the virtual cross section on the second schema and a distance of the virtual cross section in the ultrasound image from a body surface of a subject in a front-rear direction.

A seventh aspect according to the technology of the present disclosure relates to the medical support device according to the fifth aspect, in which the radiation image includes a first radiation image and a second radiation image obtained in an imaging direction different from an imaging direction of the first radiation image, the first schema image corresponds to the first radiation image, the third schema image corresponds to the second radiation image, and the position of the virtual cross section on the second schema image is derived based on the positions of the virtual cross section on the first schema image and the third schema image.

An eighth aspect according to the technology of the present disclosure relates to the medical support device according to the seventh aspect, in which the position of the virtual cross section on the third schema image is displayed based on the ultrasound image.

A ninth aspect according to the technology of the present disclosure relates to the medical support device according to the first aspect, in which, in the ultrasound image, a first blind area, which is an image region in which the breast is not imaged in the ultrasound examination, is displayed in a form distinguishable from other regions.

A tenth aspect according to the technology of the present disclosure relates to the medical support device according to the first aspect, in which, in the schema image, a second blind area, which is an image region in which the breast is not imaged in the ultrasound examination, is displayed in a form distinguishable from other regions.

An eleventh aspect according to the technology of the present disclosure relates to the medical support device according to the first aspect, in which the schema image further includes a fourth schema image, and the fourth schema image is an image that shows a fourth schema as a schematic view showing a state in which the compression member compresses the breast and that displays a position of the virtual cross section.

A twelfth aspect according to the technology of the present disclosure relates to the medical support device according to the eleventh aspect, in which the position of the virtual cross section on the fourth schema image is derived based on the position of the virtual cross section on the ultrasound image.

A thirteenth aspect according to the technology of the present disclosure relates to the medical support device according to the first aspect, in which the display image further displays information on a depth of an intersection of the virtual cross sections in a compression direction of the breast.

A fourteenth aspect according to the technology of the present disclosure relates to the medical support device according to the first aspect, in which, in a case in which the virtual cross section displayed on the schema image based on the position of the virtual cross section on the ultrasound image is defined as a first virtual cross section, a display aspect of a position of the first virtual cross section is a display aspect distinguishable from a second virtual cross section that is a virtual cross section estimated based on the position of the first virtual cross section displayed on the schema image and that is displayed on an image different from the image in which the first virtual cross section is displayed.

A fifteenth aspect according to the technology of the present disclosure relates to the medical support device according to the first aspect, in which, in a case in which the position of the virtual cross section displayed on the schema image is changed, the virtual cross section after the change has a display aspect distinguishable from the virtual cross section before the change.

A sixteenth aspect according to the technology of the present disclosure relates to a medical image capturing system comprising: the medical support device according to the first aspect; a radiography apparatus; and an ultrasonography apparatus.

A seventeenth aspect according to the technology of the present disclosure relates to a medical support method comprising: acquiring an examination image that is an image including a radiation image obtained by performing radiographic imaging of a breast in a state of being compressed by a compression member and a plurality of ultrasound images captured in a state in which the breast is compressed by the compression member in a compressed state regarded as being the same as a compressed state in the radiation image, and that displays a position of a virtual cross section on each of the ultrasound image and the radiation image, and a schema image including a first schema image as an image that shows a first schema as a schematic view showing the breast in the radiographic imaging and that displays a position of the virtual cross section based on the ultrasound image; and executing display control of displaying a display image including the examination image and the schema image.

An eighteenth aspect according to the technology of the present disclosure relates to a computer-readable storage medium storing a program causing a computer to execute a process comprising: acquiring an examination image that is an image including a radiation image obtained by performing radiographic imaging of a breast in a state of being compressed by a compression member and a plurality of ultrasound images captured in a state in which the breast is compressed by the compression member in a compressed state regarded as being the same as a compressed state in the radiation image, and that displays a position of a virtual cross section on each of the ultrasound image and the radiation image, and a schema image including a first schema image as an image that shows a first schema as a schematic view showing the breast in the radiographic imaging and that displays a position of the virtual cross section based on the ultrasound image; and executing display control of displaying a display image including the examination image and the schema image.

The technology of the present disclosure provides the medical support device, the medical image capturing system, the medical support method, and the computer-readable storage medium storing the program that facilitate association between the examination image and the schema image.

DETAILED DESCRIPTION

Hereinafter, an embodiment of the present disclosure will be described in detail with reference to the drawings.

It should be noted that, in the following description, for convenience of description, a height direction, a width direction, and a front-rear direction (also referred to as a depth direction) of a mammography apparatus 10 are indicated by three arrows X, Y, and Z. First, the height direction is indicated by the arrow Z, an arrow Z direction indicated to by the arrow Z is an up direction of the mammography apparatus 10, and the opposite direction is a down direction. The height direction is a vertical direction. The width direction is indicated by the arrow X orthogonal to the arrow Z, a direction indicated by the arrow X is a right direction of the mammography apparatus 10, and the opposite direction is a left direction. The front-rear direction is indicated by the arrow Y as a direction orthogonal to the arrow Z and the arrow X, a direction indicated by the arrow Y is the front direction of the mammography apparatus 10, and the opposite is the rear direction. That is, in the mammography apparatus 10, a side of a stand 20 is the rear direction, and a side on which a subject A stands on the opposite side (see FIG. 3) is the front direction. In addition, in the following description, the expression using the side, such as an upper side, a lower side, a left side, a right side, a front side, and a rear side, has the same meaning as the expression using the direction.

In addition, in the present embodiment, "vertical direction" refers to the vertical direction in the sense of including an error generally allowed in the technical field to which the technology of the present disclosure belongs, that is, an error to the extent that it does not contradict the gist of the technology of the present disclosure, in addition to the exact vertical direction. In addition, similarly, "horizontal direction" refers to the horizontal direction in the sense of including an error generally allowed in the technical field to which the technology of the present disclosure belongs, that is, an error to the extent that it does not contradict the gist of the technology of the present disclosure, in addition to the exact horizontal direction.

Figure 1:
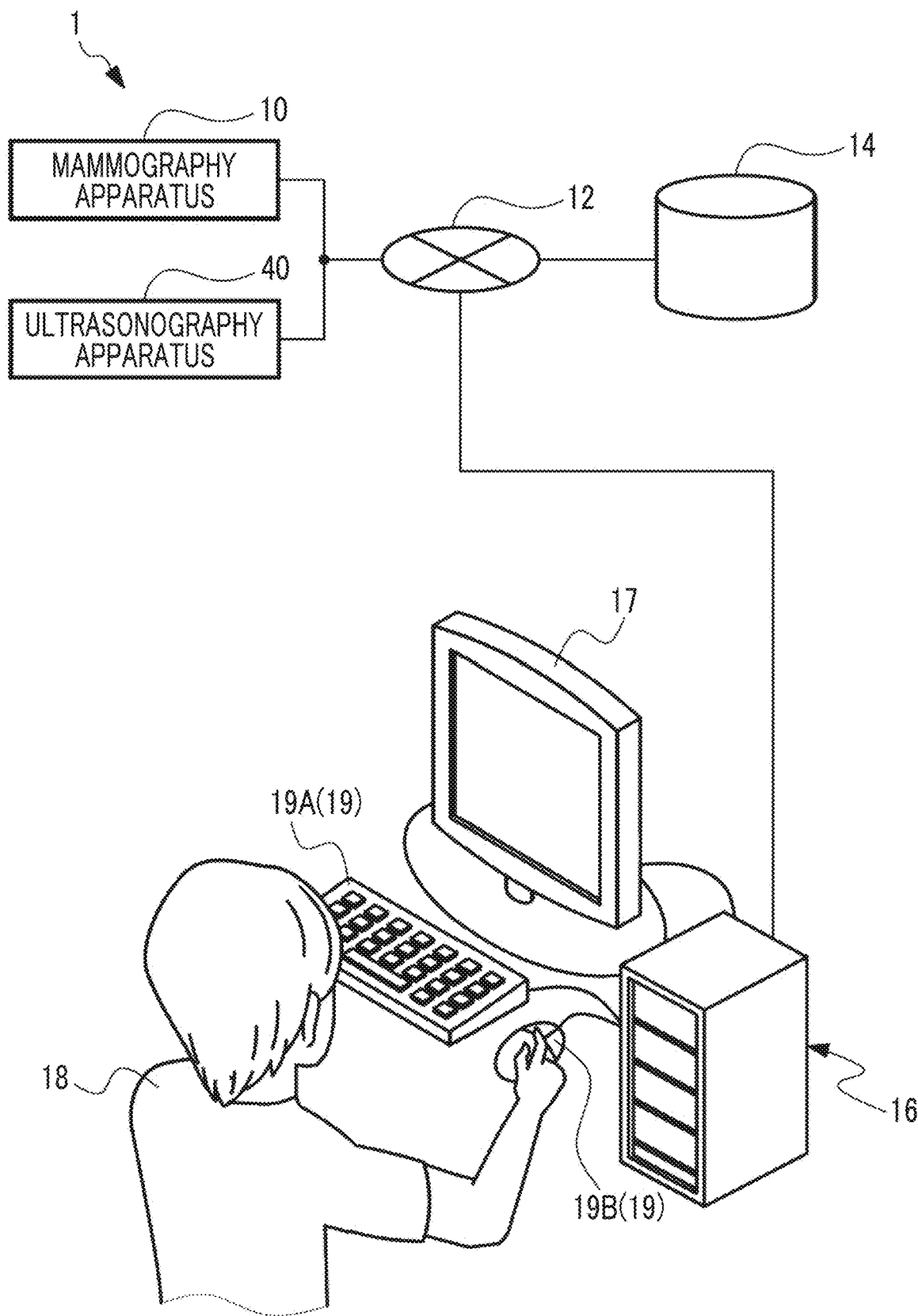
FIG. 1 is a conceptual diagram showing a configuration example of a medical support system.

As shown in FIG. 1 as an example, a medical support system 1 according to the present embodiment is a system that can provide a service including the presentation of a medical image (for example, an examination image) to a user 18 in response to a request of the user 18. The medical support system 1 is an example of a "medical image capturing system" according to the technology of the present disclosure. The medical support system 1 includes a mammography apparatus 10, an ultrasonography apparatus 40, an image database 14, and a client terminal 16. The mammography apparatus 10 is an apparatus that can acquire a radiation image by irradiating a breast of a subject with radiation. In addition, the ultrasonography apparatus 40 is an apparatus that can acquire an ultrasound image by performing an ultrasound examination on the breast of the subject. Details of the mammography apparatus 10 and the ultrasonography apparatus 40 will be described later.

The image database 14 is a database that can store image data such as the medical image. The image database 14 is connected to the mammography apparatus 10 and the ultrasonography apparatus 40 via a network 12. The network 12 is configured by, for example, at least one of a wide area network (WAN) or a local area network (LAN). Further, a connection method between the mammography apparatus 10 and the ultrasonography apparatus 40 and the network 12, and a connection method between the image database 14 and the network 12 may be a wireless communication method or a wired communication method. The network 12 establishes communication between the mammography apparatus 10 and the ultrasonography apparatus 40 and the image database 14, and transmits and receives various types of information between the mammography apparatus 10 and the ultrasonography apparatus 40 and the image database 14. The image database 14 stores the image data transmitted from the mammography apparatus 10 and the ultrasonography apparatus 40.

The client terminal 16 is a terminal operated by the user 18. The client terminal 16 is connected to the image database 14 via the network 12. A reception device 19 is connected to the client terminal 16. The reception device 19 receives an instruction from the user 18. The reception device 19 has a keyboard 19A, a mouse 19B, and the like. The keyboard 19A and the mouse 19B shown in FIG. 1 are merely examples. As the reception device 19, only one of the keyboard 19A or the mouse 19B may be provided. As the reception device 19, for example, at least one of a proximity input device that receives proximity input, a voice input device that receives voice input, or a gesture input device that receives gesture input may be applied instead of the keyboard 19A and/or the mouse 19B. The proximity input device is, for example, a touch panel or a tablet. The client terminal 16 is an example of a "medical support device" according to the technology of the present disclosure.

A display device 17 is connected to the client terminal 16. Examples of the display device 17 include an electroluminescence (EL) display and a liquid crystal display. The display device 17 displays various types of information (for example, image and text) under the control of the client terminal 16.

It should be noted that, here, a personal computer is described as an example of the client terminal 16, but this is merely an example. As the client terminal 16, a mobile terminal, such as a smartphone and a tablet terminal, may be used. Here, an example is described in which one client terminal 16 is connected to one image database 14 via the network 12, but this is merely an example. It goes without saying that the medical support system 1 may include a plurality of client terminals 16 and a plurality of image databases 14.

Figure 2:
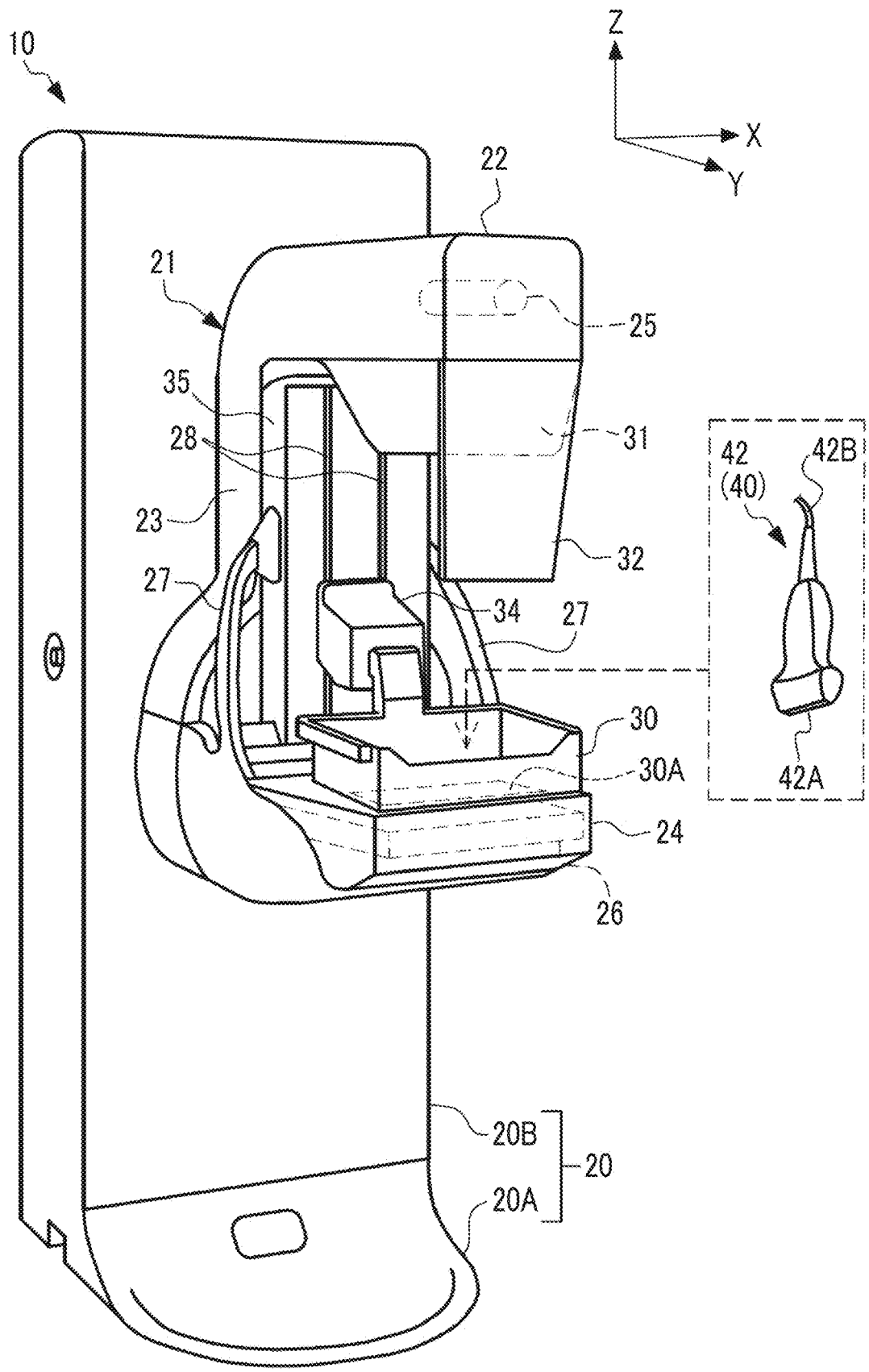
FIG. 2 is an exterior perspective view showing an example of a configuration of a mammography apparatus.
Figure 3:
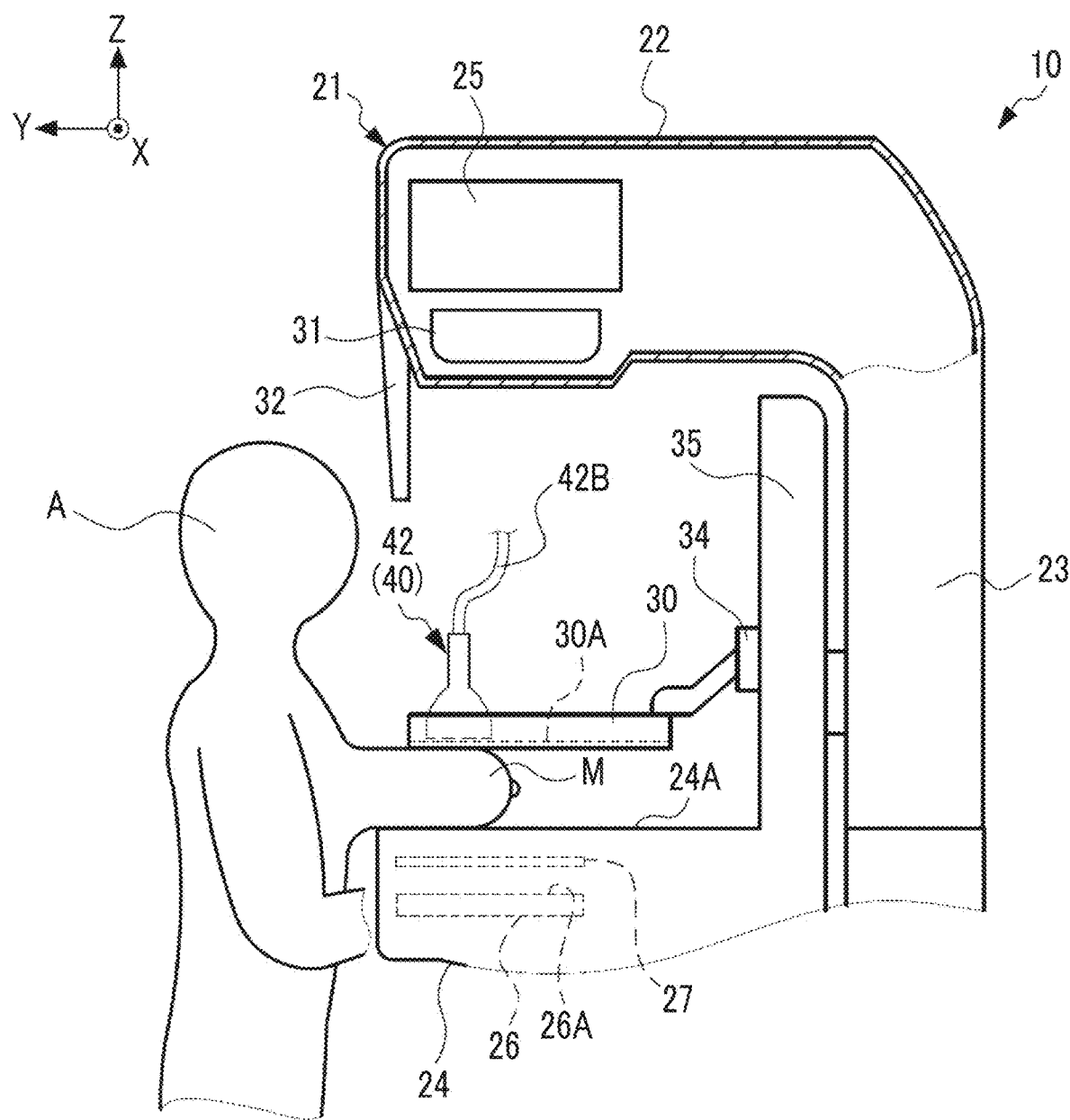
FIG. 3 is an exterior side view showing an example of the configuration of the mammography apparatus.

As shown in FIG. 2 and FIG. 3, the mammography apparatus 10 according to the present embodiment is a radiography apparatus that irradiates a breast M of a subject A as a subject with the radiation and captures a radiation image of the breast M. The radiation is, for example, X-rays, but y-rays may also be used. The subject A is located in front of the mammography apparatus 10. The mammography apparatus 10 is an example of a "radiography apparatus" according to the technology of the present disclosure.

The mammography apparatus 10 is connected to a console (not shown). The console has a function of acquiring a radiation image 62 (see FIG. 5) captured by the mammography apparatus 10 and displaying the acquired radiation image 62, in addition to a setting function of setting the mammography apparatus 10 according to an imaging order.

The mammography apparatus 10 is provided with a stand 20 and an arm 21. The stand 20 is configured by using a seat 20A installed on a floor of a radiography room and a support column 20B that extends in the height direction from the seat 20A. The arm 21 has a substantially C-shape seen from the left side, and is connected to the support column 20B via a rotation shaft. Since the arm 21 can be moved in the height direction with respect to the support column 20B, a height thereof can be adjusted according to a height of the subject A. In addition, the arm 21 can rotate about a rotation axis perpendicular to the support column 20B.

The arm 21 is configured by using a radiation source housing part 22, a body part 23, and an imaging table 24. A radiation source 25 is housed in the radiation source housing part 22. The radiation source housing part 22 has, for example, a housing structure having a longitudinal direction in the front-rear direction. The body part 23 integrally connects the radiation source housing part 22 and the imaging table 24. The body part 23 holds the radiation source housing part 22 and the imaging table 24 at predetermined positions. Handrails 27 for the subject A to grip are provided on both sides of the body part 23. The breast M of the subject A is placed on the imaging table 24. The imaging table 24 comprises an imaging surface 24A on which the radiation transmitted through the breast M is incident. A radiation detector 26 is housed in the imaging table 24.

The radiation source 25 irradiates the breast M placed on the imaging table 24 with the radiation. The radiation emitted from the radiation source 25 is transmitted through a compression member 30, and then incident on the breast M. The radiation detector 26 detects the radiation transmitted through the breast M, and outputs the radiation image. The radiation detector 26 is referred to as a flat panel detector (FPD). The radiation detector 26 may be an indirect conversion type that includes a scintillator converting the radiation into visible light and converts the visible light emitted from the scintillator into an electric signal, or may be a direct conversion type that directly converts the radiation into an electric signal.

An irradiation field limiter 31 is provided between the radiation source 25 and the imaging table 24. The irradiation field limiter 31 is also referred to as a collimator, and defines an irradiation field of the radiation to the imaging table 24.

A face guard 32 is attached to the radiation source housing part 22. The face guard 32 is made of or coated with a material that does not transmit the radiation, and protects a face of the subject A from the radiation.

The compression member 30 that interposes and compresses the breast M with the imaging table 24 is provided between the imaging table 24 and the irradiation field limiter 31. The compression member 30 is formed of a material through which the radiation is transmitted. The compression member 30 is disposed at a position facing the imaging table 24. In the present embodiment, the compression member 30 is formed in a box shape with an open upper surface side. The compression member 30 is an example of a "compression member" according to the technology of the present disclosure.

A moving mechanism 35 supports the compression member 30 to be movable between the radiation source 25 and the imaging table 24. The movable part 34 is disposed between the compression member 30 and the moving mechanism 35. The movable part 34 is held by a rail 28 provided on the moving mechanism 35 to be movable slidingly. The rail 28 stretches in the up-down direction.

The moving mechanism 35 includes, for example, a motor (not shown), a motor driver (not shown), and a feed screw mechanism (not shown). The motor rotates according to an electric drive signal output by the motor driver, and moves the compression member 30 via the feed screw mechanism.

The compression member 30 is attached to the movable part 34. The movable part 34 is moved in the up-down direction together with the compression member 30 by the moving mechanism 35. The up-down direction refers to, functionally, a direction in which the compression member 30 is directed toward the imaging table 24 (that is, the down direction) and a direction in which the compression member 30 is separated from the imaging table 24 (that is, the up direction). As described above, the compression member 30 is configured to be movable in an aspect in which an interval with the imaging table 24 is changed.

A scattered ray removal grid 27 is provided inside the imaging table 24. The scattered ray removal grid 27 removes scattered rays generated due to the radiation being transmitted through the breast M. The scattered ray removal grid 27 is disposed inside the imaging table 24 on the radiation source 25 side with respect to the radiation detector 26.

As described above, the radiation is applied from the radiation source 25 in a state in which the breast M of the subject A is compressed by the compression member 30. The radiation transmitted through the breast M is detected by the radiation detector 26. As a result, the radiation image of the breast M is acquired.

In addition, in the present embodiment, the ultrasound examination is performed by the ultrasonography apparatus 40 along with the radiographic imaging via the mammography apparatus 10. The ultrasonography apparatus 40 is an example of an "ultrasonography apparatus" according to the technology of the present disclosure. The ultrasonography apparatus 40 comprises an ultrasound probe 42.

The ultrasound probe 42 is moved along an upper surface (surface opposite to the side in contact with the breast M of the subject A) of the bottom plate 30A of the compression member 30 by the user, and acquires the ultrasound image of the breast M by scanning the breast M with ultrasound. Specifically, in a case in which the ultrasound imaging is performed, the ultrasound probe 42 is moved along the upper surface of the bottom plate 30A of the compression member 30 by a medical worker in a state in which an acoustic matching member (not shown), such as an echo gel, is applied to the upper surface of the compression member 30 or in a state in which the acoustic matching member is attached to the ultrasound probe 42.

The ultrasound probe 42 comprises a plurality of ultrasound transducers (not shown) that are one-dimensionally or two-dimensionally arranged. Each of the ultrasound transducers transmits the ultrasound based on the applied drive signal, receives ultrasound echoes, and outputs a reception signal.

Each of the plurality of ultrasound transducers is composed of, for example, a transducer in which electrodes are formed at both ends of a piezoelectric material (piezoelectric body), such as a piezoelectric ceramic represented by lead (Pb) zirconate titanate (PZT), or a polymer piezoelectric element represented by polyvinylidene difluoride (PVDF).

In a case in which a pulsed or continuous wave drive signal is transmitted to apply a voltage to the electrodes of the transducer, the piezoelectric body is expanded and contracted. Pulsed or continuous wave ultrasound is generated from each transducer by the expansion and contraction and the ultrasound is synthesized to form an ultrasound beam. Each transducer receives the propagated ultrasound and is then expanded and contracted to generate an electric signal. The electric signals are output as the reception signals of the ultrasound and are input to the body (not shown) of the ultrasonography apparatus 40 via a cable 42B.

Examples of a scanning direction of the ultrasound probe 42 include a left-right direction (X direction shown in FIG. 2) of the mammography apparatus 10. In this case, the ultrasound probe 42 is disposed such that a longitudinal direction (that is, the arrangement direction of the transducers) of the contact surface 42A is along the front-rear direction (Y direction shown in FIG. 2) of the mammography apparatus 10. That is, the ultrasound probe 42 comprising the one-dimensional transducer is scanned in an elevation direction. The ultrasound probe 42 is scanned in the left-right direction a plurality of times while being displaced in the front-rear direction. The plurality of echo images of the breast M obtained in this way are subjected to image reconstruction processing and used for generating an ultrasound cross-sectional image of the breast M.

Specifically, a three-dimensional image is obtained by combining a plurality of echo images of the breast M. The three-dimensional image is volume data in which a plurality of two-dimensional slice images are stacked, and is composed of a plurality of voxels which are units of three-dimensional pixels. It is possible to extract a two-dimensional image in any cross section from the three-dimensional image. For example, it is possible to extract a two-dimensional slice image of a transverse plane, a two-dimensional slice image of a coronal plane, and a two-dimensional slice image of a sagittal plane from the three-dimensional image. The ultrasound image, which is an image showing any cross section in the three-dimensional image, is obtained in this way.

The ultrasound examination as described above is performed in a compressed state regarded as being the same as a compressed state of the breast M in the radiographic imaging. Here, the compressed state regarded as being the same refers to the compression at the same compression pressure and the same compression thickness, and further desirably includes a case in which the radiation image is acquired in a compressed state, and then the echo image is continuously acquired in a state in which the compressed state is not released. Stated another way, the compressed state regarded as being the same includes a form in which the compression is released after the radiographic imaging is performed, the breast M is compressed under the same compression conditions, and the ultrasound examination is performed. Here, the compression conditions include a type of the compression member 30, a thickness of the breast M during the compression, and a contact area between the compression member 30 and the breast M, in addition to the compression pressure and the compression height.

Figure 4:
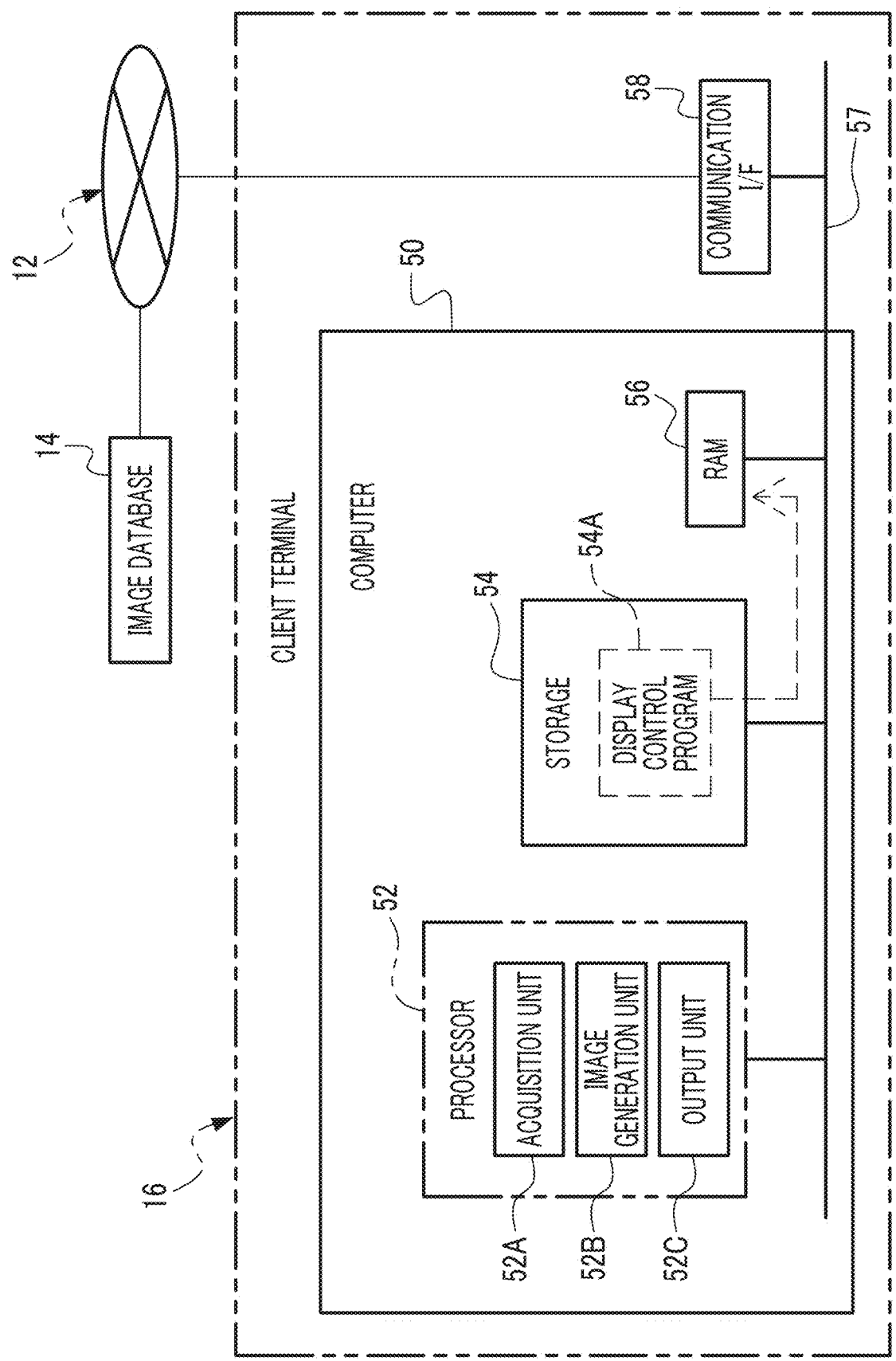
FIG. 4 is a diagram showing an example of a hardware configuration of an electric system of a client terminal.

As shown in FIG. 4 as an example, the client terminal 16 comprises a computer 50, a communication interface (I/F) 58, and a bus 57. The computer 50 comprises a processor 52, a storage 54, and a random access memory (RAM) 56. The processor 52, the storage 54, the RAM 56, and the communication I/F 58 are connected to a bus 57. The computer 50 is an example of a "computer" according to the technology of the present disclosure, and the processor 52 is an example of a "processor" according to the technology of the present disclosure.

A memory is connected to the processor 52. The memory includes the storage 54 and the RAM 56. The processor 52 includes a central processing unit (CPU) and a graphics processing unit (GPU). The GPU is operated under the control of the CPU, and is responsible for executing processing related to the image.

The storage 54 is a nonvolatile storage device that stores various programs, various parameters, and the like. Examples of the storage 54 include a flash memory (for example, an electrically erasable and programmable read only memory (EEPROM) and a solid state drive (SSD)), and/or a hard disk drive (HDD). It should be noted that the flash memory and the HDD are merely examples, and at least one of the flash memory, the HDD, a magnetoresistive memory, or a ferroelectric memory may be used as the storage 54.

The RAM 56 is a memory that transitorily stores information, and is used as a work memory by the processor 52. Examples of the RAM 56 include a dynamic random access memory (DRAM) or a static random access memory (SRAM).

The communication I/F 58 is connected to the network 12. The communication I/F 58 controls the exchange of information with an external communication apparatus (for example, the image database 14) via the network 12. For example, the communication I/F 58 transmits the information in response to a request from the processor 52 to the external communication apparatus via the network 12. In addition, the communication I/F 58 receives the information transmitted from the external communication apparatus, and outputs the received information to the processor 52 via the bus 57.

Meanwhile, in the present embodiment, the radiographic imaging and the ultrasound examination are performed on the breast M in a compressed state regarded as being the same, and as a result, the radiation image and the ultrasound image are obtained. In this case, the user 18 may need to perform interpretation by comparing the radiation image and the ultrasound image acquired in a compressed state regarded as being the same. In a case of the interpretation, a schema as a schematic view showing the breast may be used, and the schema may be compared with a diagnosis image obtained by the examination. In this way, since the ways of viewing the images or the display contents are different between the examination images of different types or between the examination image and the schema, the images cannot be simply compared. Therefore, it is difficult to associate the examination image with the schema image (for example, to associate positions of a region of interest (for example, a lesion)).

Therefore, the storage 54 stores a display control program 54A. The display control program 54A is a program that provides display control processing of the radiation image, the ultrasound image, and the like. The processor 52 reads out the display control program 54A from the storage 54 and executes the readout display control program 54A on the RAM 56 to perform the display control processing. The display control processing is realized by the processor 52 operating as an acquisition unit 52A, an image generation unit 52B, and an output unit 52C. The display control program 54A is an example of a "program" according to the technology of the present disclosure.

Figure 5:
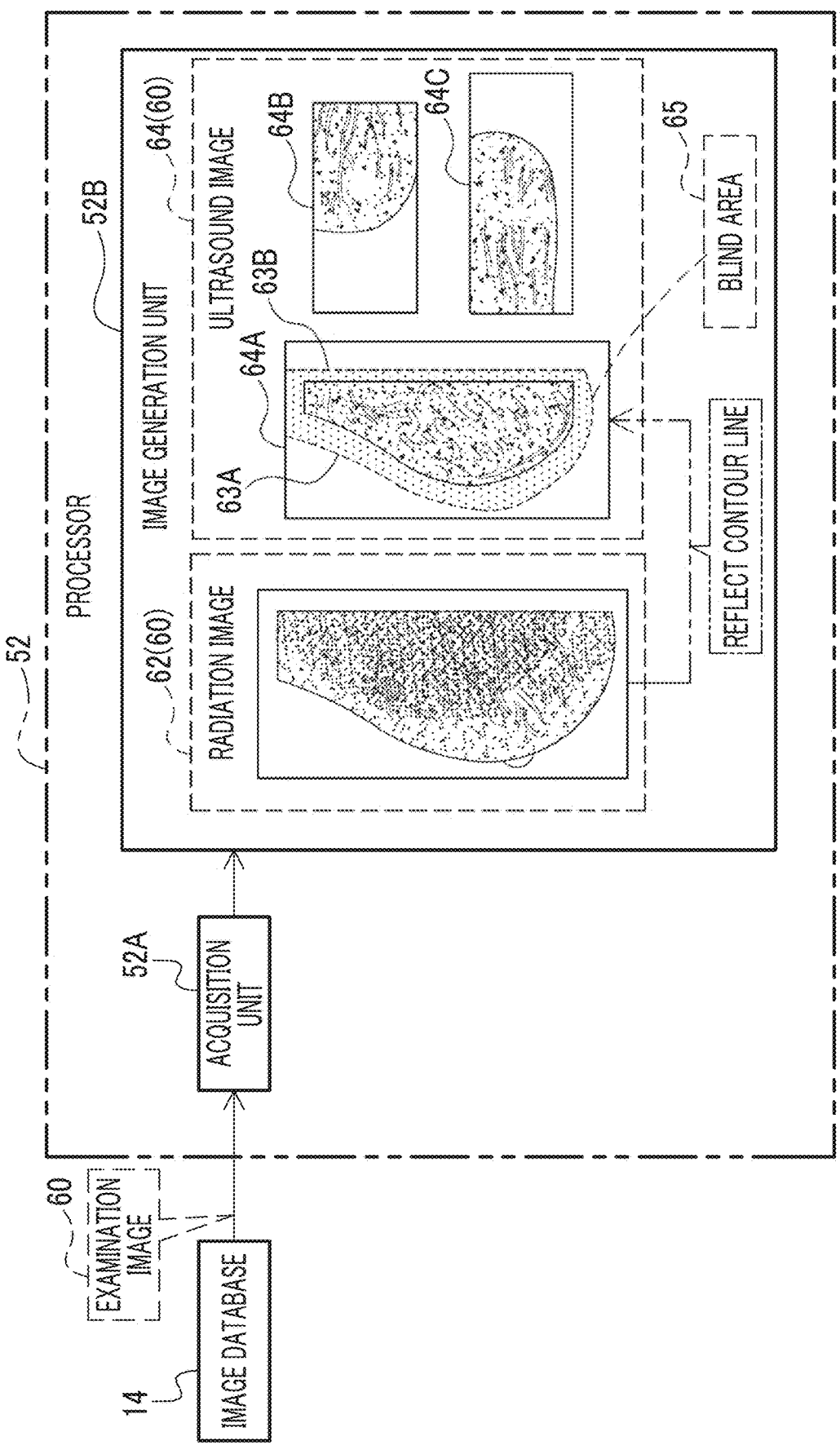
FIG. 5 is a conceptual diagram showing an example of main functions of a processor of the client terminal.

As shown in FIG. 5 as an example, in the processor 52, first, the acquisition unit 52A acquires an examination image 60 from the image database 14 via the communication I/F 58 (see FIG. 4). The examination image 60 is an image showing an examination result for the subject A. The examination image 60 includes the radiation image 62 and an ultrasound image 64. The examination image 60 is an example of an "examination image" according to the technology of the present disclosure. The radiation image 62 is an image obtained as a result of the radiographic imaging using the mammography apparatus 10 (see FIG. 2). Specifically, the radiation image 62 is an image obtained by performing radiographic imaging of the breast M in a state of being compressed by the compression member 30 (see FIG. 2). In addition, the radiation image 62 is an example of a "radiation image" according to the technology of the present disclosure.

It should be noted that, here, as an imaging technique, a medio-lateral (MLO) imaging is shown in which the breast M is compressed and imaged from a direction inclined with respect to a cranio-caudal direction of the subject is performed, and the radiation image 62 obtained as a result thereof. In the following description of the present embodiment, as an example, a case will be described in which MLO imaging is performed as the radiographic imaging.

The radiation image 62 is obtained by performing the imaging in a state in which the radiation source 25 is held at a predetermined position (for example, a position facing the imaging table 24) with respect to the imaging table 24. In the radiation image 62 obtained by performing the imaging in such a state, a contour of the breast M may be less visible than a case of so-called tomosynthesis imaging. Therefore, the association of the ultrasound image 64 and/or a schema image 66 with the radiation image 62 as described above may be difficult.

The ultrasound image 64 is an image obtained by imaging the breast M in a state of being compressed by the compression member 30 (see FIG. 2) in a compressed state regarded as being the same as a compressed state in the radiation image 62. Specifically, the ultrasound image 64 is an image obtained by generating the two-dimensional image in any cross section with respect to the three-dimensional image obtained as a result of the ultrasound examination performed in a compressed state regarded as being the same as a compressed state in the radiographic imaging. In a case in which there is no particular designation from the user 18, the cross-sectional image generated from the three-dimensional image in the initial setting is a two-dimensional image showing a cross section passing through the center of the three-dimensional image. The ultrasound image 64 is an example of an "ultrasound image" according to the technology of the present disclosure.

Figure 6:
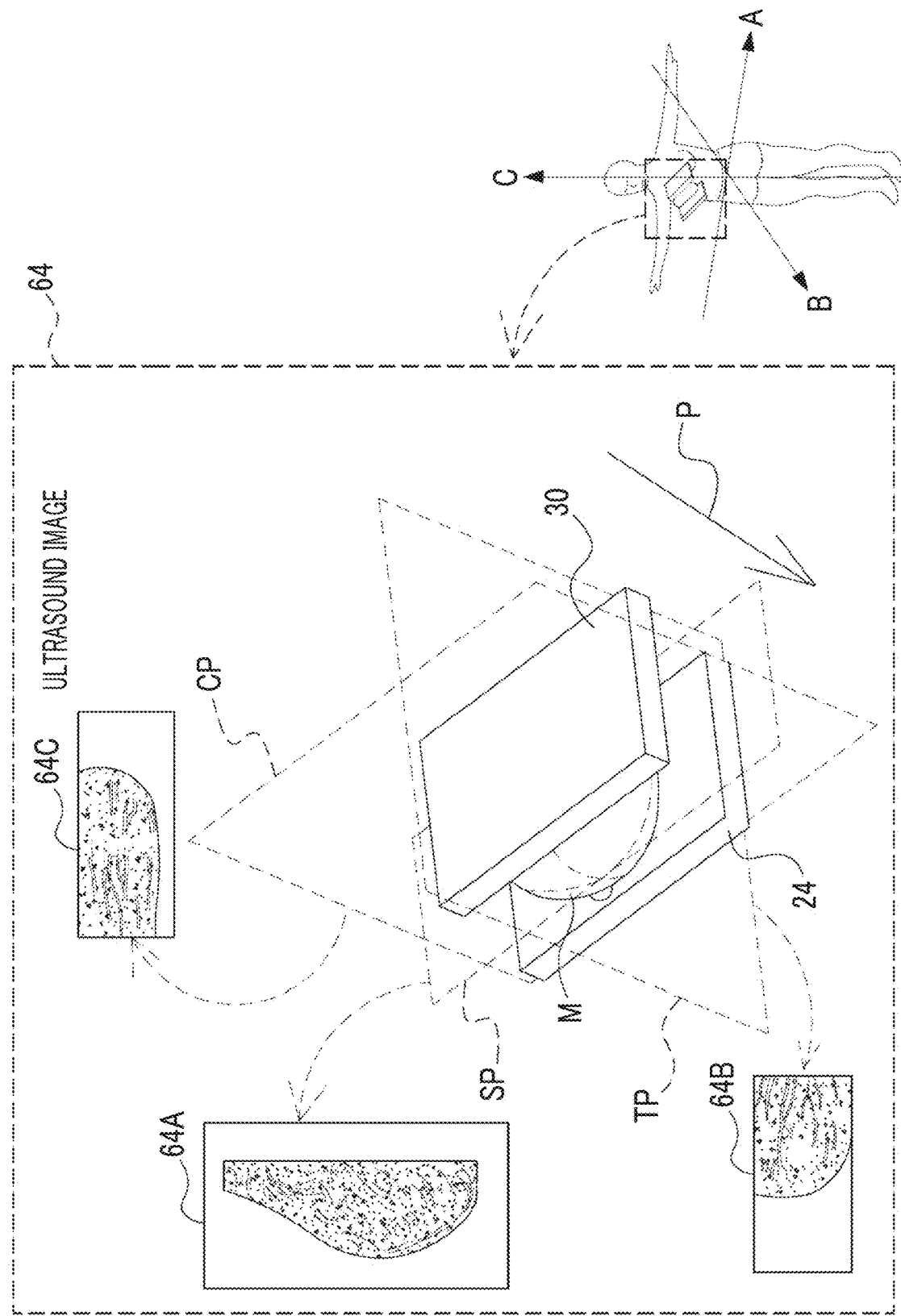
FIG. 6 is a conceptual diagram showing an example of an ultrasound image of each cross section of a breast in a compressed state.

Here, the ultrasound image 64 includes a plurality of ultrasound cross-sectional images 64A to 64C. The plurality of ultrasound cross-sectional images 64A to 64C are cross-sectional images obtained by slicing the three-dimensional image with the cross sections orthogonal to each other. In the example shown in FIG. 6, the ultrasound cross-sectional image 64A is an image showing a sagittal plane SP that is a cross section orthogonal to the compression direction of the breast M (see an arrow P in FIG. 6) and that is a cross section of the breast M at any distance from the bottom plate 30A of the compression member 30. In addition, for example, the ultrasound cross-sectional image 64B is an image showing a transverse plane TP that is a cross section parallel to the compression direction of the breast M and that is a cross section of the breast M along the front-rear direction (direction along a B direction shown in FIG. 6) of the subject A. In addition, for example, the ultrasound cross-sectional image 64C is an image showing a coronal plane CP that is a cross section parallel to the compression direction of the breast M and that is a cross section of the breast M along the left-right direction (direction along an A direction shown in FIG. 6) of the subject A.

Hereinafter, for convenience of description, the ultrasound cross-sectional image 64A will be referred to as a sagittal plane ultrasound image 64A, the ultrasound cross-sectional image 64B will be referred to as a transverse plane ultrasound image 64B, and the ultrasound cross-sectional image 64C will be referred to as a coronal plane ultrasound image 64C.

As shown in FIG. 5, the acquisition unit 52A outputs the acquired examination image 60 to the image generation unit 52B. Here, the radiation image 62 and the ultrasound image 64 have a difference in a range in which the breast M is displayed in the image due to a difference in the imaging principle. Specifically, on a distal end side (that is, a nipple side) of the breast M, a gap is likely to be generated between the compression member 30 and the breast M, and it is difficult to obtain the reflected waves, so that the reflected waves may not be easily imaged in the ultrasound image 64. That is, in the ultrasound image 64, a defect of the breast M may occur.

In addition, on a chest wall side of the breast M, there is also a limitation on a scanning possible range caused by an offset amount between the transducer in the ultrasound probe 42 and an outer shape of the ultrasound probe 42, or a plate thickness of the compression member 30. That is, in the ultrasound probe 42, the transducer is disposed with an offset from an outer edge of a housing of the ultrasound probe 42 toward an inner side. Therefore, in a case in which the ultrasound probe 42 is scanned inside the box-shaped compression member 30, the housing of the ultrasound probe 42 is in contact with the inner wall of the compression member 30, and there is a range in which the ultrasound beam from the transducer is not applied. Therefore, it may be difficult for the chest wall side of the breast M to be imaged in the ultrasound image 64.

Therefore, the image generation unit 52B detects the contour of an image region indicating the distal end side of the breast M in the radiation image 62 acquired from the acquisition unit 52A. For the detection of a contour line in the image generation unit 52B, for example, a brightness value of each pixel of the radiation image 62 can be used. That is, in the radiation image 62, a boundary portion in which a difference in the brightness value is equal to or larger than a threshold value is detected as the contour. It should be noted that this is merely an example, and for example, the contour line may be detected by performing image recognition processing (for example, image recognition processing of pattern matching method, image recognition processing of artificial intelligence (AI) method, or the like) on the radiation image 62. The image generation unit 52B reflects the contour line detected in the radiation image 62 in the ultrasound image 64.

The contour line detected in the radiation image 62 is displayed on the ultrasound image 64. Specifically, the contour line is reflected in the sagittal plane ultrasound image 64A. Here, the radiation image 62 is an image obtained by the MLO imaging. Therefore, the sagittal plane ultrasound image 64A is a cross-sectional image seen in an imaging direction of the radiation image 62. In a case in which the contour line of the radiation image 62 is reflected in the sagittal plane ultrasound image 64A, a size of the contour line in the radiation image 62 is adjusted according to an image size of the sagittal plane ultrasound image 64A, and a contour line 63A is superimposed and displayed on the sagittal plane ultrasound image 64A.

In addition, as a method of deriving the contour line on the chest wall side in the ultrasound image 64, the contour line is displayed based on the limitation of the scanning possible range caused by the offset amount between the transducer in the ultrasound probe 42 and the outer shape of the ultrasound probe 42. Since the offset amount of the transducer is predetermined in the ultrasound probe 42, the contour line is displayed on the chest wall side in the ultrasound image 64 based on the offset amount. For example, a straight line-shaped contour line 63B is superimposed and displayed on the sagittal plane ultrasound image 64A at a position separated by the offset amount from a display region on the chest wall side.

In the sagittal plane ultrasound image 64A, a portion between the contour lines 63A and 63B and the image region of the breast M in the sagittal plane ultrasound image 64A is derived as a blind area 65. In addition, a portion interposed between the contour lines 63A and 63B, that is, a portion between an image upper end and the image region of the breast M and a portion between an image lower end and the image region of the breast M is also derived as the blind area 65. Here, the blind area 65 is an image region in which the breast M is not imaged in the ultrasound examination. The image generation unit 52B displays the blind area 65 in an aspect distinguishable from the other regions of the sagittal plane ultrasound image 64A (see a range hatched with dots shown in FIG. 5). It should be noted that, here, a pattern is added to display the blind area 65 in a form distinguishable from the other image regions, but this is merely an example. For example, an aspect may be adopted in which shading or color is added to the blind area 65 or the blind area 65 is blinked. A text indicating the blind area 65 may be displayed. The blind area 65 is an example of a "first blind area" according to the technology of the present disclosure.

Figure 7:
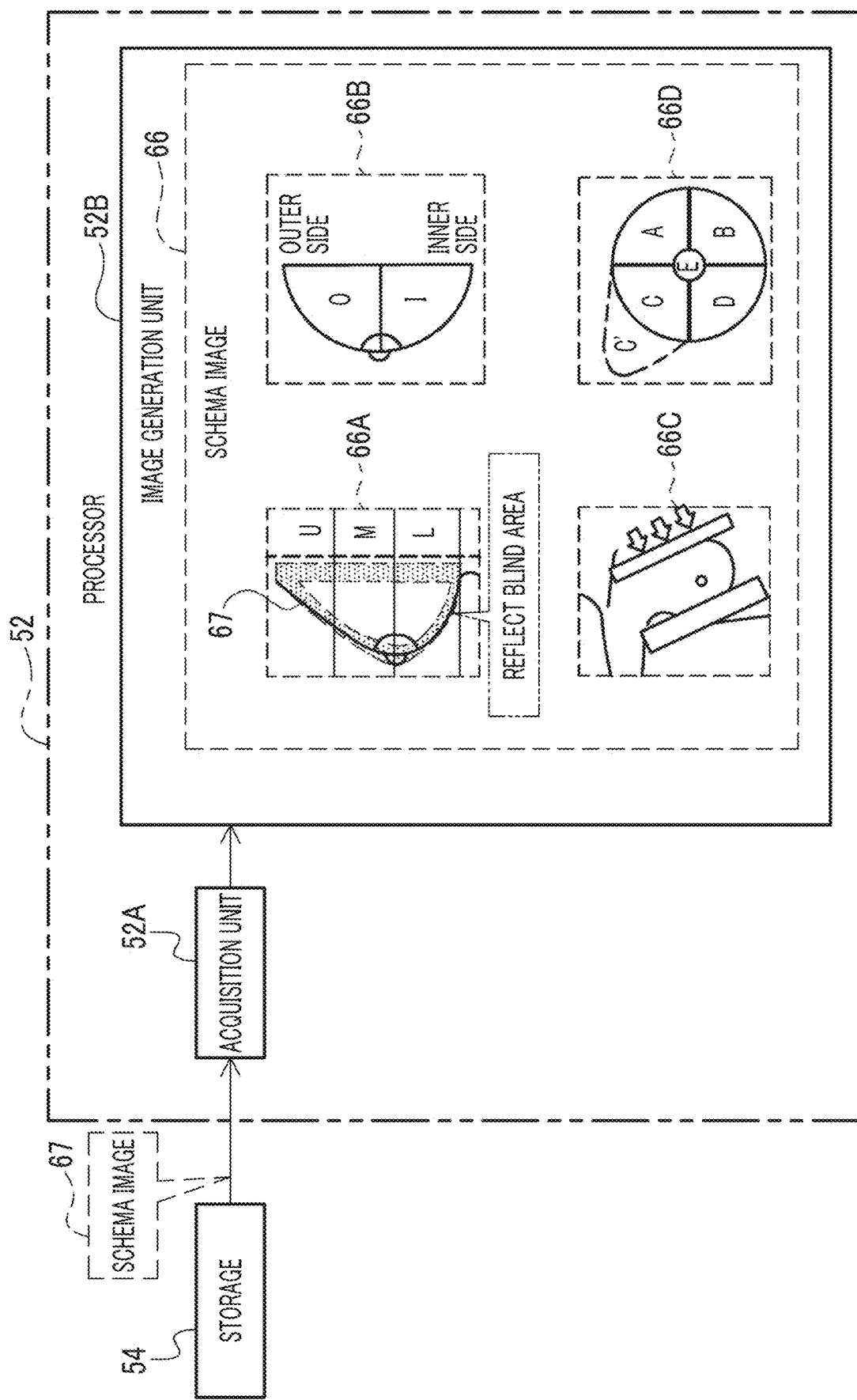
FIG. 7 is a conceptual diagram showing an example of main functions of the processor of the client terminal.

As shown in FIG. 7 as an example, the acquisition unit 52A acquires the schema image 66 from the storage 54. The schema image 66 is an image showing a schema as a schematic view of the breast M. It should be noted that the schema image 66 may be a generally used template or may be an image created by the user 18. In addition, the schema image 66 need not be stored in the storage 54, and may be acquired from an external device via the network 12.

The acquisition unit 52A outputs the acquired schema image 66 to the image generation unit 52B. The schema image 66 includes an MLO schema image 66A. The MLO schema image 66A is an image showing an MLO schema as a schematic view of the breast M in the MLO imaging. In the present embodiment, the MLO schema image 66A is an example of a "first schema image" according to the technology of the present disclosure. The image generation unit 52B superimposes and displays the blind area on the MLO schema image 66A. Specifically, the blind area 65 derived in the sagittal plane ultrasound image 64A is adjusted according to a size of the MLO schema image 66A and is superimposed and displayed on the MLO schema image 66A. In the example shown in FIG. 7, a blind area 67 corresponding to the blind area 65 is displayed in a form distinguishable from the other regions in the MLO schema image 66A (see a range hatched with dots shown in FIG. 7). The blind area 67 is an example of a "second blind area" according to the technology of the present disclosure.

In the example shown in FIG. 7, the schema image 66 includes a schema image other than the MLO schema image 66A. For example, the schema image 66 includes a CC schema image 66B. The CC schema image 66B is an image showing a CC schema as a schematic view of the breast M in CC imaging. The cranio-caudal (CC) imaging is an imaging technique of imaging the breast M by compressing the breast M in the cranio-caudal direction of the subject A. In the present embodiment, the CC schema image 66B shows a schema in a direction in which the imaging is not performed. In the present embodiment, the CC schema image 66B is an example of a "third schema image" according to the technology of the present disclosure.

The schema image 66 includes a compression schema image 66C. The compression schema image 66C is an image showing a compression schema as a schematic view showing a state in which the compression member 30 compresses the breast M. The compression schema image 66C is an example of a "fourth schema image" according to the technology of the present disclosure.

The schema image 66 further includes an ultrasound schema image 66D. The ultrasound schema image 66D is an image showing a schema as a schematic view corresponding to the ultrasound examination image of an examination method performed by placing the ultrasound probe 42 on the breast M. The ultrasound schema image 66D is an example of a "second schema image" according to the technology of the present disclosure.

The examination method performed by placing the ultrasound probe 42 on the breast M is, specifically, an examination method in which the echo gel is applied to the surface of the breast M and the breast M is directly scanned with the ultrasound probe 42, and is an examination method different from the ultrasound examination performed in a state in which the breast M is compressed by the compression member 30 as described above.

Figure 8:
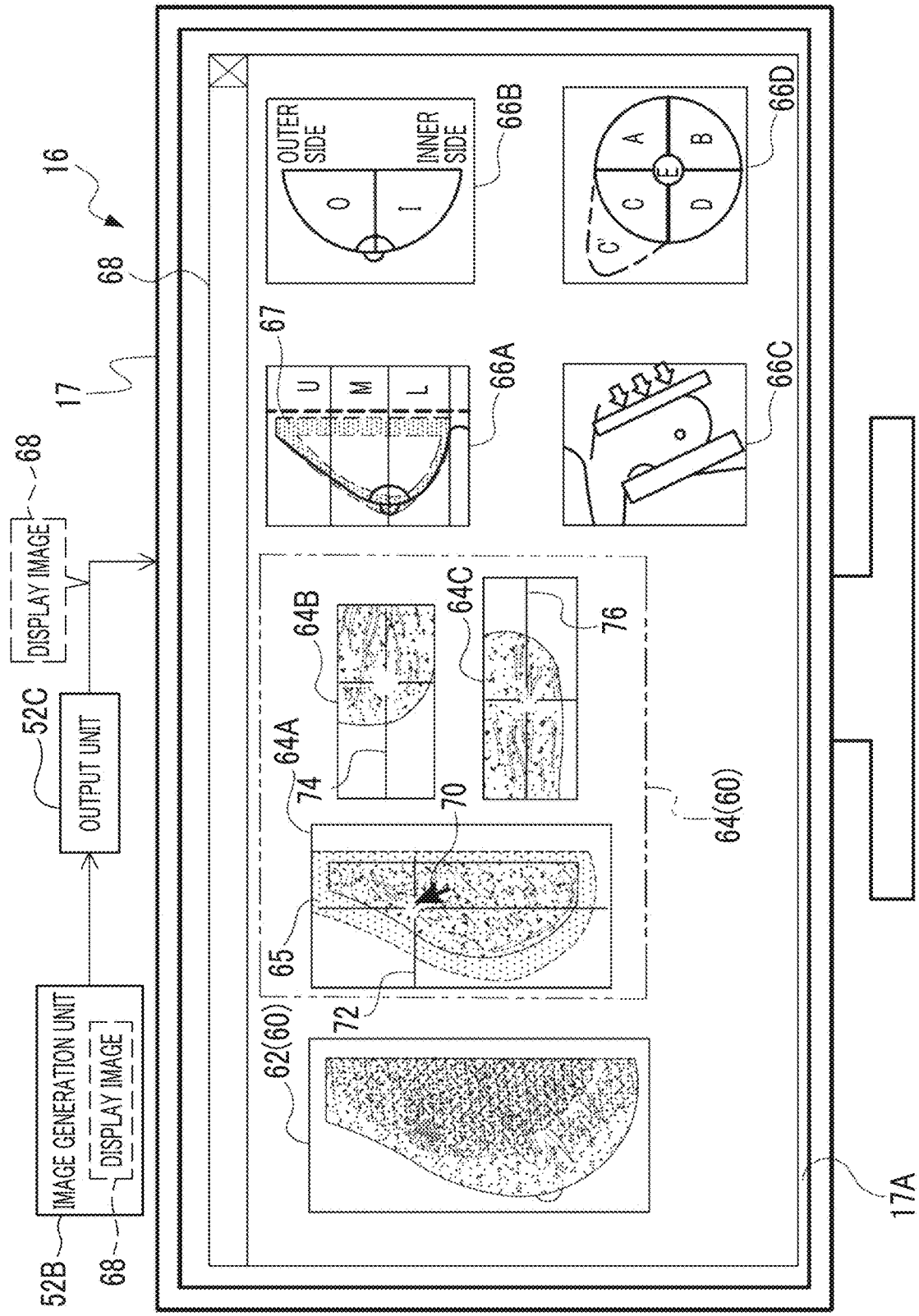
FIG. 8 is a conceptual diagram showing an example of main functions of the processor of the client terminal.

As shown in FIG. 8 as an example, the image generation unit 52B generates a display image 68 including the examination image 60 and the schema image 66. The image generation unit 52B outputs the generated display image 68 to the output unit 52C. The output unit 52C outputs information indicating the display image 68 to the display device 17. Specifically, the output unit 52C displays, on the display device 17, the display image 68 by executing graphical user interface (GUI) control for displaying the display image 68. The GUI control is an example of "display control" according to the technology of the present disclosure. The display image 68 is an example of a "display image" according to the technology of the present disclosure.

The display image 68 is displayed on a screen 17A of the display device 17. In the example shown in FIG. 8, the examination image 60 is displayed in a left image region in the display image 68. The examination image 60 includes the radiation image 62 and the ultrasound image 64. In addition, the ultrasound image 64 includes the sagittal plane ultrasound image 64A, the transverse plane ultrasound image 64B, and the coronal plane ultrasound image 64C. The blind area 65 is displayed on the sagittal plane ultrasound image 64A.

In addition, in the example shown in FIG. 8, the schema image 66 is displayed in a right image region in the display image 68. The schema image 66 includes the MLO schema image 66A, the CC schema image 66B, the compression schema image 66C, and the ultrasound schema image 66D. The blind area 67 is displayed on the MLO schema image 66A.

It should be noted that the layout (that is, a display position and/or a size) of each image in the display image 68 shown in FIG. 8 is merely an example, and it goes without saying that the layout of each image can be appropriately changed. In addition, it goes without saying that information other than the examination image 60 and the schema image 66 (for example, information for specifying the subject A or information for specifying the examination contents (for example, an examination date and time, a person in charge of examination, and/or the compression conditions), and the like) may be displayed on the display image 68. In addition, the display image 68 need not be displayed on one window, and may be displayed on a plurality of windows. In this case, each of the plurality of windows may be displayed on separate display devices 17.

In the example shown in FIG. 8, the examination image 60 for one breast M is displayed, but this is merely an example. An aspect may be adopted in which the examination image 60 for each of the left and right breasts M is displayed. In this case, the schema image 66 may be displayed for each of the examination images 60 of the left and right breasts M.

Here, any portion on the ultrasound image 64 is designated via a pointer 70 by the user 18 (see FIG. 1) operating the mouse 19B. Any portion is, for example, a region of interest to the user 18 (hereinafter, also simply referred to as a "region of interest"). Hereinafter, as an example, a case will be described in which the user 18 designates the region of interest. The region of interest is, for example, a region in which a lesion (for example, a tumor) exists. In the example shown in FIG. 8, in the sagittal plane ultrasound image 64A, the region of interest is designated via the pointer 70. In a case in which the region of interest is designated via the pointer 70, a mark indicating a virtual cross section is displayed at a position corresponding to the region of interest in the ultrasound image 64.

In the example shown in FIG. 8, a cross-shaped mark 72 (hereinafter, also simply referred to as a "mark 72") corresponding to the position indicated by the pointer 70 is displayed in response to the mouse-over of the pointer 70 on the sagittal plane ultrasound image 64A. In the cross-shaped mark 72, a line segment of the sagittal plane ultrasound image 64A along the left-right direction corresponds to a virtual cross section indicated by the transverse plane ultrasound image 64B. In the cross-shaped mark 72, a line segment of the sagittal plane ultrasound image 64A along the up-down direction corresponds to a virtual cross section indicated by the coronal plane ultrasound image 64C.

Further, in a case in which the region of interest is designated on the sagittal plane ultrasound image 64A and the cross-shaped mark 72 is displayed, a cross-shaped mark 74 (hereinafter, also simply referred to as a "mark 74") is displayed on the transverse plane ultrasound image 64B. Similarly, a cross-shaped mark 76 (hereinafter, also simply referred to as a "mark 76") is displayed on the coronal plane ultrasound image 64C. The display positions of the marks 72, 74, and 76 correspond to each other. For example, in a case in which the mark 72 is moved in the sagittal plane ultrasound image 64A, the transverse plane ultrasound image 64B and the coronal plane ultrasound image 64C are updated according to the virtual cross section after the movement. Further, the positions of the marks 74 and 76 respectively displayed on the transverse plane ultrasound image 64B and the coronal plane ultrasound image 64C are also changed.

Here, the form example is described in which the region of interest is designated on the sagittal plane ultrasound image 64A, but this is merely an example. It goes without saying that the region of interest may be designated on the transverse plane ultrasound image 64B and the coronal plane ultrasound image 64C.

In the following description, in a case in which it is not necessary to distinguish between the virtual cross section indicated by the sagittal plane ultrasound image 64A, the virtual cross section indicated by the transverse plane ultrasound image 64B, and the virtual cross section indicated by the coronal plane ultrasound image 64C, the virtual cross sections are simply referred to as "virtual cross section".

Figure 9:
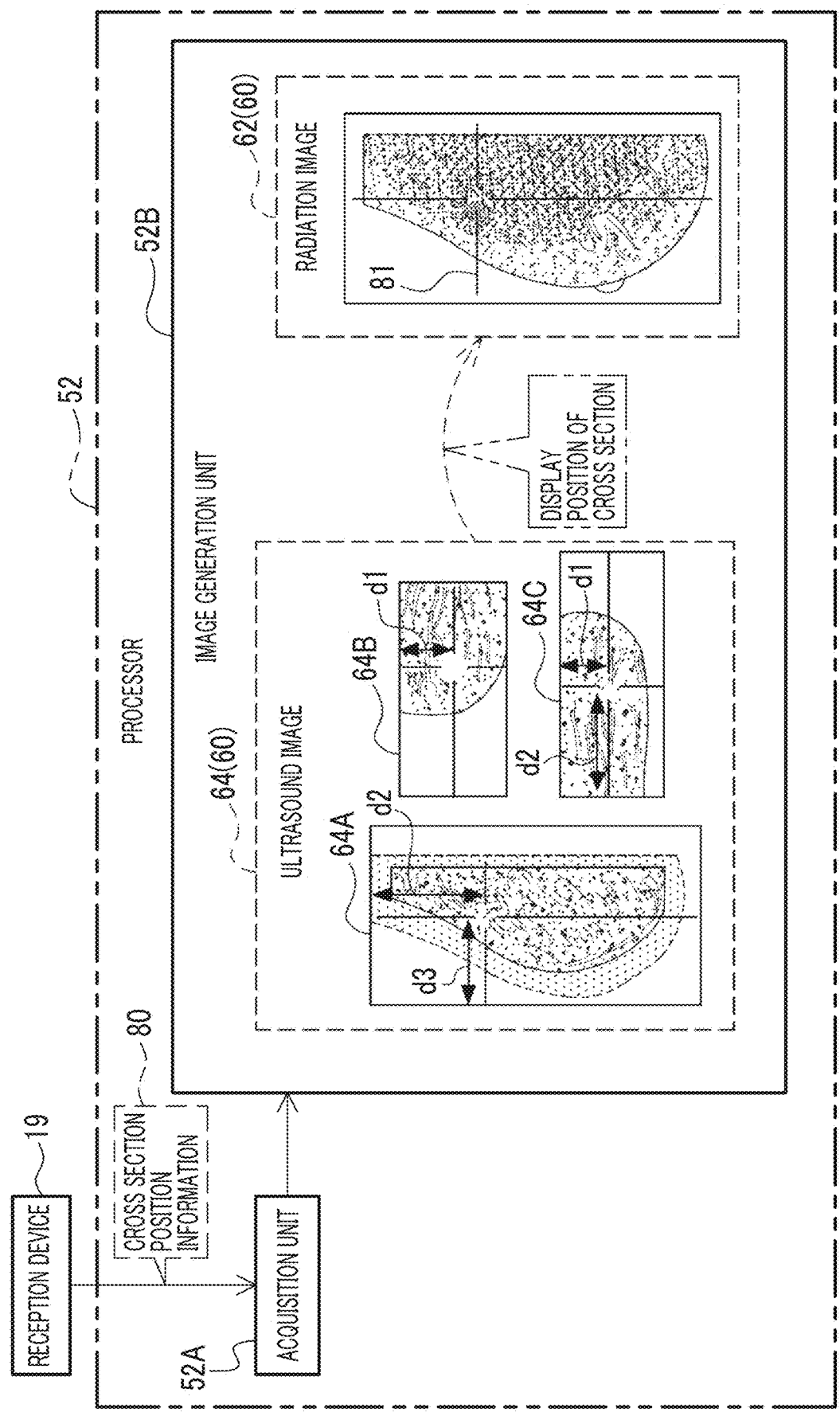
FIG. 9 is a conceptual diagram showing an example of main functions of the processor of the client terminal.

As shown in FIG. 9 as an example, the image generation unit 52B displays the virtual cross section on the radiation image 62 based on the ultrasound image 64. First, the acquisition unit 52A acquires cross section position information 80 received via the reception device 19. The cross section position information 80 is information for specifying a position of the virtual cross section on the ultrasound image 64. The acquisition unit 52A outputs the cross section position information 80 to the image generation unit 52B. The image generation unit 52B displays the position of the cross section on the radiation image 62 based on the cross section position information 80.

Specifically, the image generation unit 52B displays each virtual cross section on the radiation image 62 according to a distance of each virtual cross section indicated by the cross section position information 80 from an image end part of the ultrasound image 64. Here, in the sagittal plane ultrasound image 64A, the transverse plane has a distance d2 from the image upper end, and the coronal plane has a distance d3 from the image left end. As described above, the sagittal plane ultrasound image 64A is a cross-sectional image seen from the imaging direction of the radiation image 62. Therefore, the image generation unit 52B adjusts the distances d2 and d3 according to the size of the radiation image 62, to superimpose and display the respective cross sections on the radiation image 62. In the example shown in FIG. 9, a cross-shaped mark 81 (hereinafter, also simply referred to as a "mark 81") indicating a position of the virtual cross section is displayed on the radiation image 62.

Figure 10:
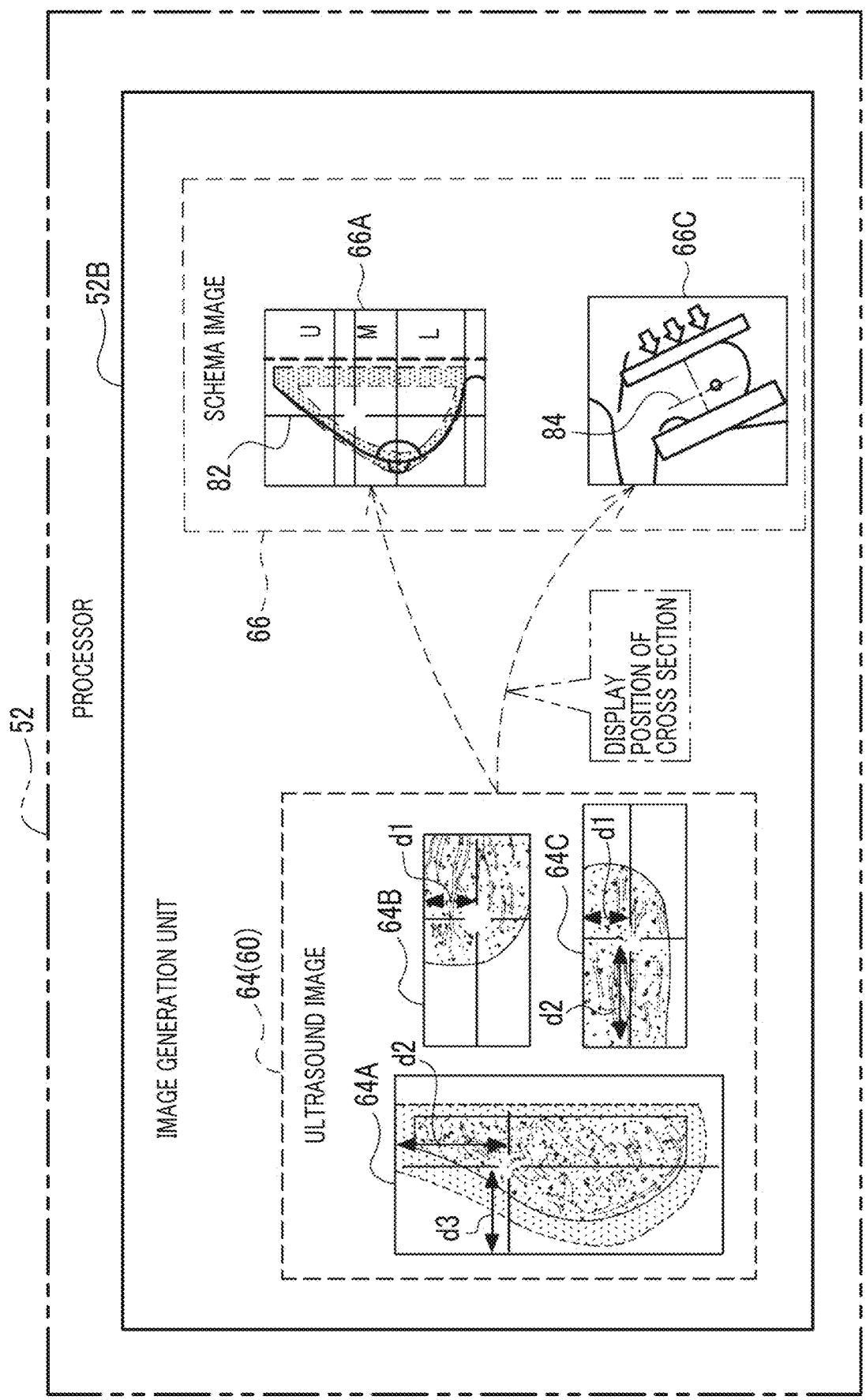
FIG. 10 is a conceptual diagram showing an example of main functions of a processor of the client terminal.

As shown in FIG. 10 as an example, the image generation unit 52B displays the virtual cross section on the schema image 66. The image generation unit 52B displays the position of the virtual cross section on the MLO schema image 66A based on the ultrasound image 64. Specifically, the image generation unit 52B performs the same processing as in a case in which the position of the virtual cross section is displayed on the radiation image 62.

More specifically, the image generation unit 52B adjusts the distances d2 and d3 in the sagittal plane ultrasound image 64A according to the size of the MLO schema image 66A, to superimpose and display the positions of the respective virtual cross sections on the MLO schema image 66A. In the example shown in FIG. 10, a cross-shaped mark 82 (hereinafter, also simply referred to as a "mark 82") indicating a position of the virtual cross section is displayed on the MLO schema image 66A. A line segment of the cross-shaped mark 82 along the up-down direction of the image corresponds to a virtual cross section indicated by the coronal plane ultrasound image 64C. A line segment of the cross-shaped mark 82 along the left-right direction of the image corresponds to a virtual cross section indicated by the transverse plane ultrasound image 64B.

In addition, the image generation unit 52B displays the position of the virtual cross section based on the cross section position information 80 on the compression schema image 66C. Specifically, in the coronal plane ultrasound image 64C, the sagittal plane has a distance d1 from the image upper end and a distance d2 from the image left end. The coronal plane ultrasound image 64C is a cross-sectional image of the breast M seen from the front side of the subject A, similarly to the compression schema image 66C. Therefore, the image generation unit 52B adjusts these distances d1 and d2 according to the size of the breast M in the compression schema image 66C, to superimpose and display the positions of the respective virtual cross sections on the compression schema image 66C. A cross-shaped mark 84 (hereinafter, also simply referred to as a "mark 84") indicating a position of the virtual cross section is displayed on the compression schema image 66C. A line segment of the cross-shaped mark 84 along the compression direction corresponds to a virtual cross section indicated by the transverse plane ultrasound image 64B. A line segment of the cross-shaped mark 84 along the direction orthogonal to the compression direction corresponds to a virtual cross section indicated by the sagittal plane ultrasound image 64A.

Figure 11:
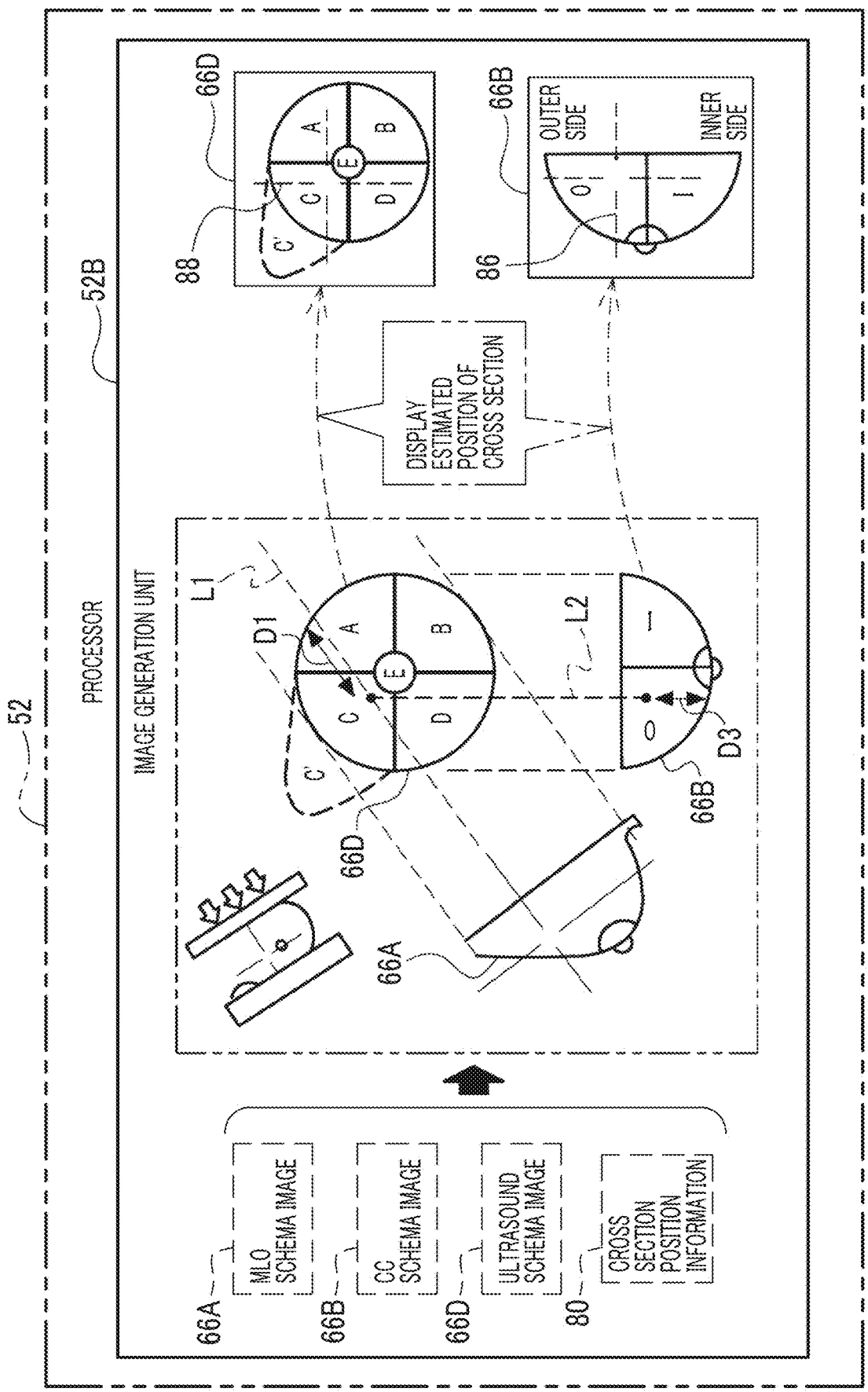
FIG. 11 is a conceptual diagram showing an example of main functions of the processor of the client terminal.

As shown in FIG. 11 as an example, the image generation unit 52B displays the position of the virtual cross section on the ultrasound schema image 66D based on the position of the virtual cross section on the MLO schema image 66A and the cross section position information 80. Here, there is a geometrical positional relationship between the MLO schema image 66A and the ultrasound schema image 66D. That is, the MLO schema image 66A is a schematic view of the breast M seen from the compression direction in a state in which the breast M is compressed in a direction inclined in the cranio-caudal direction. In addition, the ultrasound schema image 66D is a schematic view of the breast M seen from the front side in a state in which the breast M is not compressed. Therefore, the MLO schema image 66A is disposed below (here, on the lower left side of) the ultrasound schema image 66D in the compression direction, and the positions of the upper and lower ends of the MLO schema image 66A and the ultrasound schema image 66D are aligned in the direction orthogonal to the compression direction of the breast M. In such a disposition, in the ultrasound schema image 66D, the position of the virtual cross section is located on a straight line L1 extending from an intersection of the virtual cross sections in the MLO schema image 66A along the compression direction. The image generation unit 52B derives the straight line L1 based on the geometrical positional relationship between the MLO schema image 66A and the ultrasound schema image 66D.

Further, the position of the intersection of the virtual cross sections in the ultrasound schema image 66D on the straight line L1 is determined by a depth D1 in the compression direction of the breast M. Here, the depth D1 is a depth of the virtual cross section indicated by the sagittal plane ultrasound image 64A from the body surface. More specifically, the depth D1 is a distance in the compression direction from a position in contact with the breast M of the compression member 30 in a compressed state of the breast M to the virtual cross section indicated by the sagittal plane ultrasound image 64A. That is, the depth D1 corresponds to the distance d1 in the transverse plane ultrasound image 64B or the coronal plane ultrasound image 64C. The distance d1 is a distance from the image upper end (that is, the contact position with the compression member 30) to the position of the virtual cross section indicated by the sagittal plane ultrasound image 64A. The image generation unit 52B changes the distance d1 indicated by the cross section position information 80 according to the size of the ultrasound schema image 66D, to calculate the depth D1. In the ultrasound schema image 66D, a position separated from a boundary (that is, a surface of the breast M) on the straight line L1 by the depth D1 is estimated as the position of the intersection of the virtual cross sections. As a result, the position of the virtual cross section of the ultrasound schema image 66D is estimated.

The image generation unit 52B displays the position of the virtual cross section on the ultrasound schema image 66D. In the example shown in FIG. 11, a cross-shaped mark 86 (hereinafter, also simply referred to as a "mark 86") is displayed on the ultrasound schema image 66D. Here, the mark 86 has a display aspect in which the mark 86 is distinguishable from the mark 82 displayed on the MLO schema image 66A. Specifically, the mark 82 displayed on the MLO schema image 66A is displayed by a solid line, and the mark 86 displayed on the ultrasound schema image 66D is displayed by a broken line.

The position of the virtual cross section indicated by the mark 86 displayed on the MLO schema image 66A is displayed based on the cross section position information 80 of the ultrasound image 64. Meanwhile, the position of the virtual cross section indicated by the mark 86 displayed on the ultrasound schema image 66D is estimated based on the position of the virtual cross section displayed on the MLO schema image 66A. That is, the mark 82 displayed based on the cross section position information 80 and the mark 86 estimated based on the position of the virtual cross section of the MLO schema image 66A are displayed in a form distinguishable from each other.

In addition, the image generation unit 52B displays the position of the virtual cross section on the CC schema image 66B based on the position of the virtual cross section on the ultrasound schema image 66D and the cross section position information 80. Here, there is a geometrical positional relationship between the ultrasound schema image 66D and the CC schema image 66B. That is, as described above, the ultrasound schema image 66D is a schematic view of the breast M seen from the front side. The CC schema image 66B is a schematic view of the breast M seen from the compression direction in a state in which the breast M is compressed from above. Therefore, the CC schema image 66B is disposed below the ultrasound schema image 66D, and the left and right ends of the ultrasound schema image 66D and the CC schema image 66B are aligned. In such a disposition, in the CC schema image 66B, the position of the intersection of the virtual cross sections is located on a straight line L2 extending downward from the position of the intersection of the virtual cross sections in the ultrasound schema image 66D. The image generation unit 52B derives the straight line L2 based on the geometrical positional relationship between the ultrasound schema image 66D and the CC schema image 66B.

Further, the position of the intersection of the virtual cross sections in the CC schema image 66B on the straight line L2 is determined by a distance D3 from the body surface. Here, the distance D3 is a distance of the virtual cross section indicated by the coronal plane ultrasound image 64C from the body surface. More specifically, the distance D3 is a distance from the body surface of the breast M in a compressed state of the breast M. That is, the distance D3 corresponds to the distance d3 in the sagittal plane ultrasound image 64A. The distance d3 is a distance from the image left end to the virtual cross section indicated by the coronal plane ultrasound image 64C. The image generation unit 52B changes the distance d3 indicated by the cross section position information 80 according to the size of the CC schema image 66B, to calculate the distance D3. In the CC schema image 66B, a position separated from a boundary (that is, a front side surface of the breast M) on the straight line L2 by the distance D3 is estimated as the position of the intersection of the virtual cross sections. As a result, the position of the virtual cross section of the CC schema image 66B is estimated.

The image generation unit 52B displays the position of the virtual cross section on the CC schema image 66B. In the example shown in FIG. 11, a cross-shaped mark 88 (hereinafter, also simply referred to as a "mark 88") is displayed on the CC schema image 66B. As in the ultrasound schema image 66D, the mark 88 has a display aspect distinguishable from the mark 86 displayed on the MLO schema image 66A, and the mark 88 is displayed by a broken line.

Figure 12:
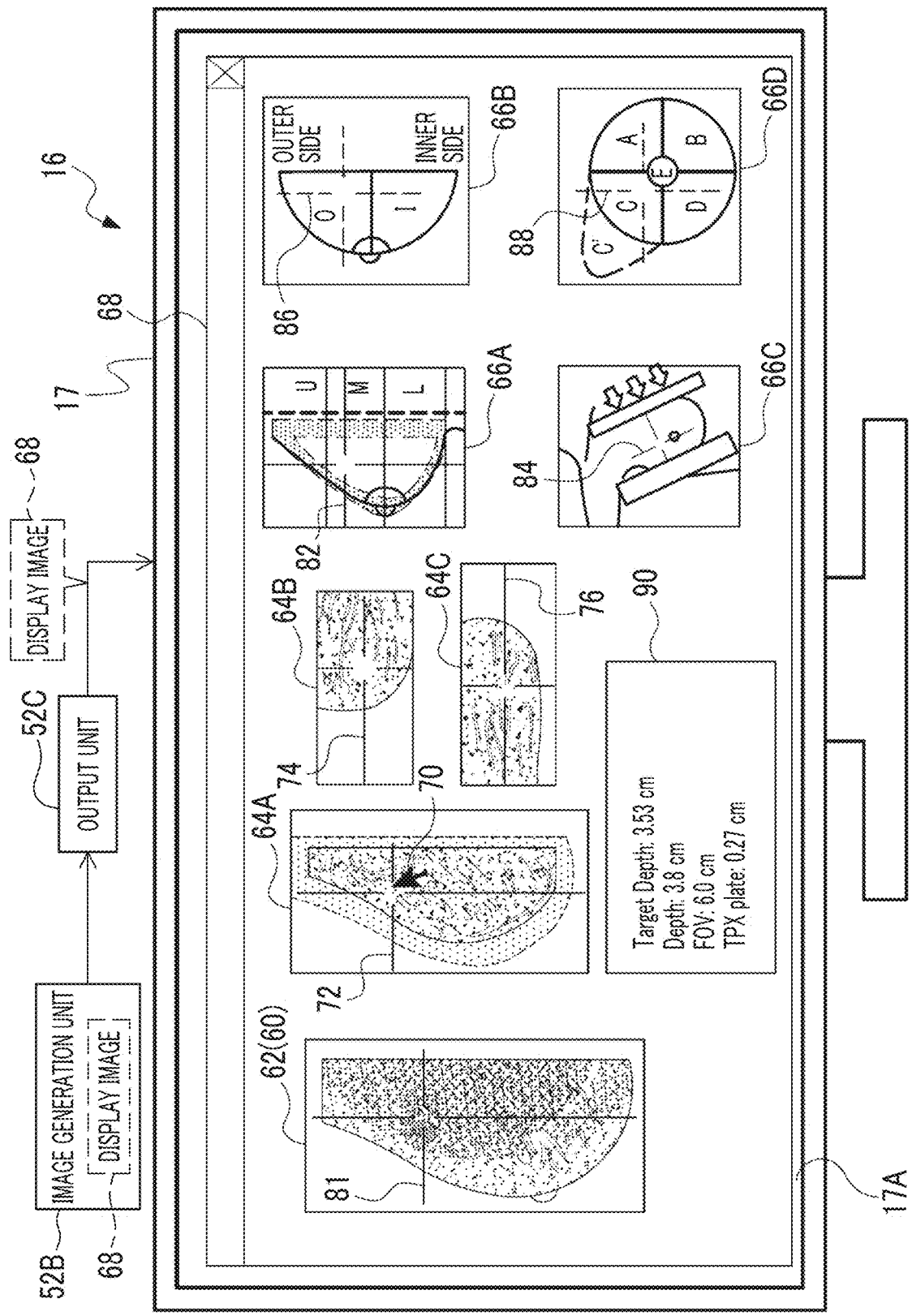
FIG. 12 is a conceptual diagram showing an example of main functions of the processor of the client terminal.

As shown in FIG. 12 as an example, the image generation unit 52B generates the display image 68 including the examination image 60 that displays the position of the virtual cross section and the schema image 66 that displays the position of the virtual cross section. The image generation unit 52B generates the text indicating the position of the region of interest based on the cross section position information 80. A text box 90 indicating the position of the region of interest is included in the display image 68.

Here, as described above, the position of the region of interest is the position of the intersection of the mark 72 in a case of the sagittal plane ultrasound image 64A. Each line segment of the mark 72 indicates the position of the virtual cross section. In other words, it can also be said that the position of the region of interest indicates the position of the intersection of the virtual cross sections, and the text box 90 indicates information regarding the position of the intersection of the virtual cross sections.

The image generation unit 52B outputs the generated display image 68 to the output unit 52C, and the output unit 52C displays the display image 68 on the display device 17 by performing the GUI control for displaying the display image 68.

In the example shown in FIG. 12, the mark 81 is displayed on the radiation image 62 by designating the region of interest via the pointer 70 on the display image 68. The mark 81 corresponds to the mark 72 displayed on the sagittal plane ultrasound image 64A. That is, the mark 81 indicates the position of the virtual cross section, similarly to the mark 72.

The mark 81 displayed on the radiation image 62 is moved in conjunction with the movement of the marks 72, 74, and 76 on the ultrasound image 64. That is, the mark 81 is linked with the marks 72, 74, and 76 displayed on the ultrasound image 64. In other words, the marks 72, 74, and 76 on the ultrasound image 64 can also be moved by moving the mark 81.

In addition, in a case in which the region of interest is designated via the pointer 70 on the display image 68, the mark 82 is displayed on the MLO schema image 66A. The mark 82 indicates the position of the virtual cross section of the ultrasound image 64 on the MLO schema image 66A. Here, the position of the virtual cross section on the ultrasound image 64 is a virtual cross section determined by designating the region of interest via the pointer 70. Therefore, in the MLO schema image 66A, the mark 82 also indicates the position of the region of interest. Specifically, the position of the intersection of the respective line segments of the cross-shaped mark 82 indicates the position of the region of interest.

In addition, in a case in which the region of interest is designated via the pointer 70 on the display image 68, the mark 84 is also displayed on the compression schema image 66C. In the compression schema image 66C, the mark 84 indicates the position of the virtual cross section of the ultrasound image 64, and the position of the intersection of the cross-shaped mark 84 indicates the position of the region of interest.

Further, in a case in which the region of interest is designated via the pointer 70 on the display image 68, the mark 86 is displayed on the CC schema image 66B. In the CC schema image 66B, the mark 86 indicates the position of the virtual cross section estimated based on the ultrasound image 64, and the position of the intersection of the cross-shaped mark 86 indicates the position of the region of interest.

In addition, in a case in which the region of interest is designated via the pointer 70 on the display image 68, the mark 88 is also displayed on the ultrasound schema image 66D. In the ultrasound schema image 66D, the mark 88 indicates the position of the virtual cross section estimated based on the ultrasound image 64, and the position of the intersection of the cross-shaped mark 88 indicates the position of the region of interest.

In addition, the text box 90 is displayed on the display image 68. The text box 90 shows a text related to the region of interest designated via the pointer 70. In the example shown in FIG. 12, the following text is shown in the text box 90.

"Target Depth: 3.53 cm
Depth: 3.8 cm
FOV: 6.0 cm
TPX plate: 0.27 cm"

Here, Target depth refers to a depth to the region of interest excluding the thickness of the bottom plate 30A of the compression member 30, Depth refers to a depth to the region of interest, FOV refers to a field of view depth, and TPX plate refers to a thickness of the bottom plate 30A of the compression member 30.

As described above, in a case in which the region of interest is designated on the display image 68, the position of the virtual cross section showing the region of interest is displayed not only in the ultrasound image 64 but also in the radiation image 62 and the schema image 66.

Figure 13:
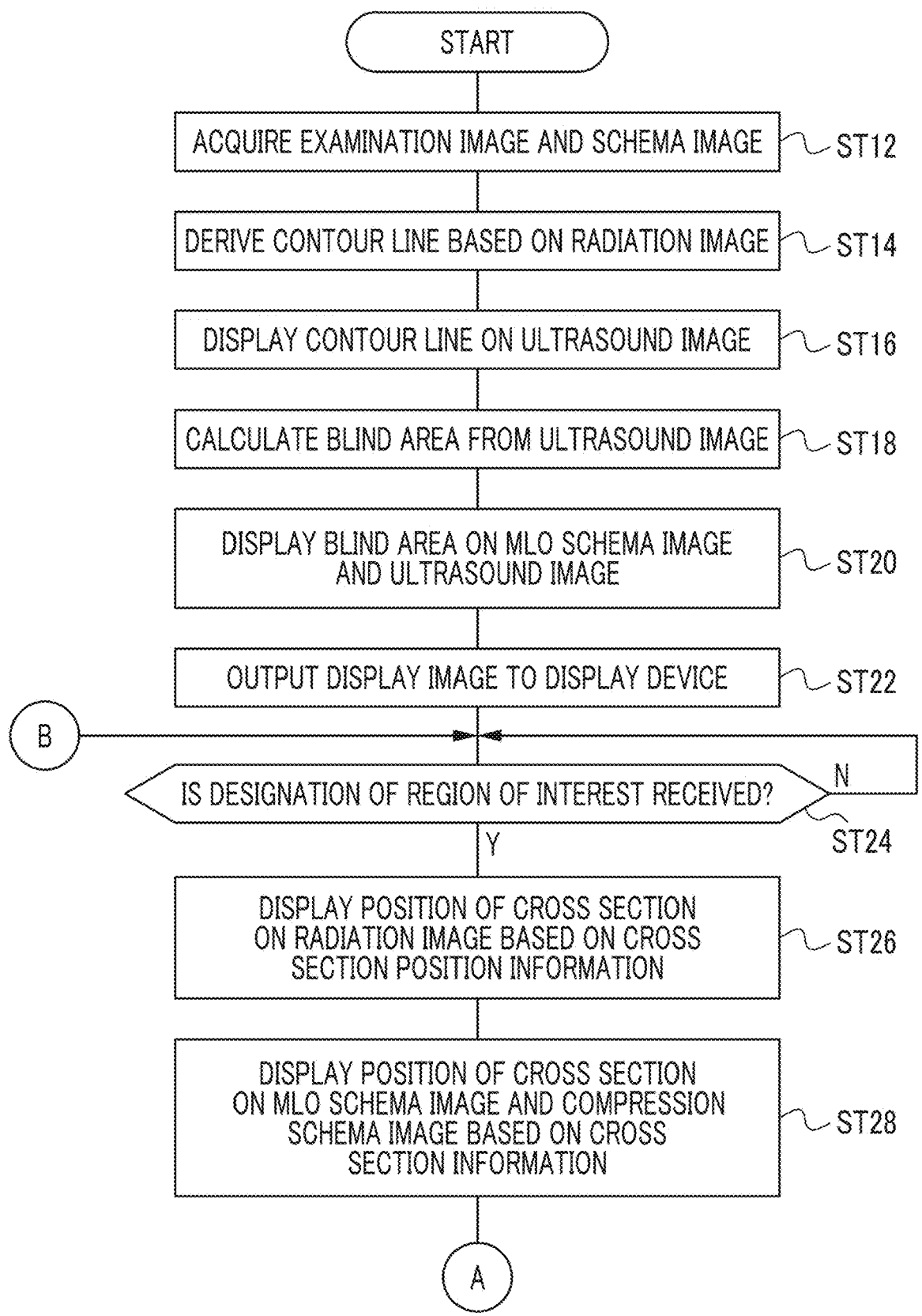
FIG. 13 is a flowchart showing an example of a flow of display control processing.
Figure 14:
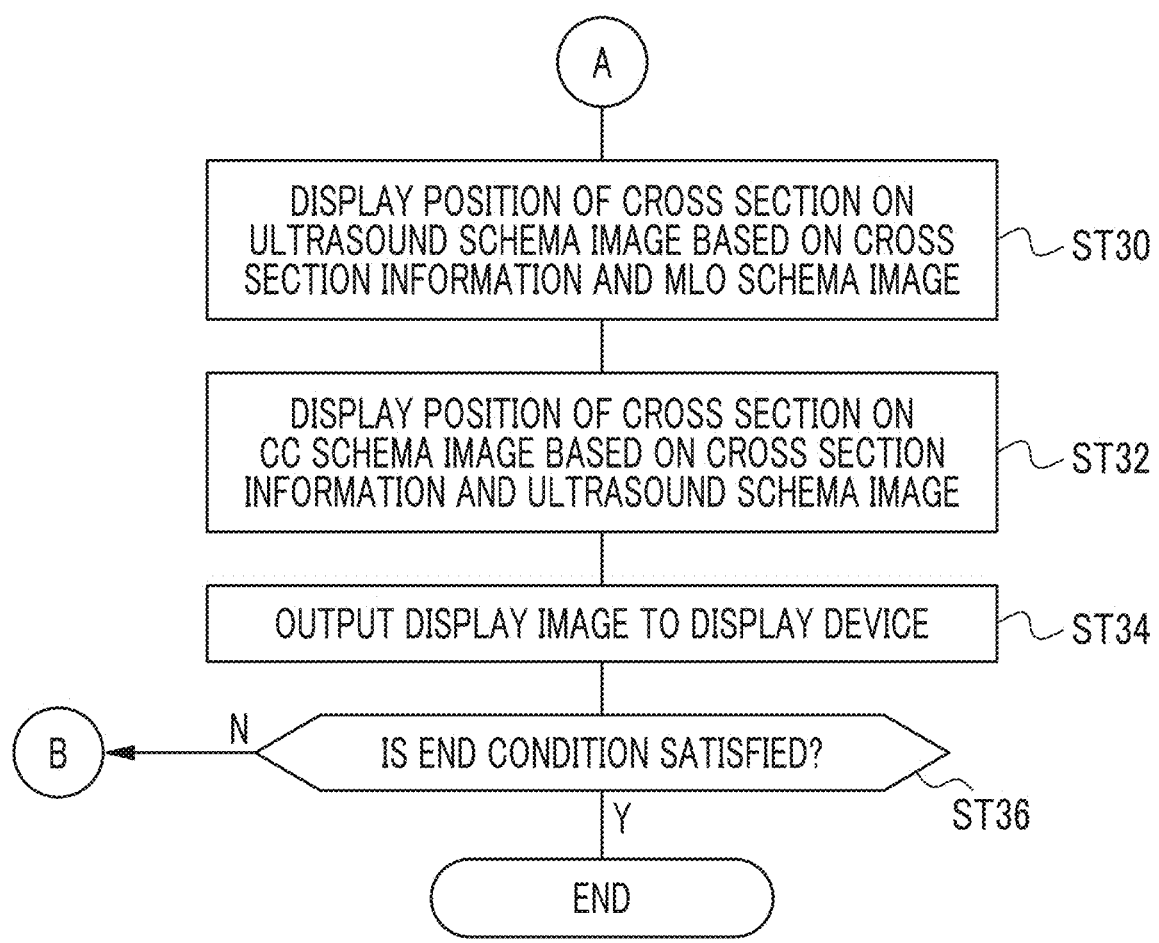
FIG. 14 is a flowchart showing an example of a flow of the display control processing.

Hereinafter, the display control processing in the client terminal 16 according to the present embodiment will be described with reference to FIGS. 13 and 14. FIGS. 13 and 14 are flowcharts showing examples of the display control processing. The flow of the processing shown in FIGS. 13 and 14 is an example of a "medical support method" according to the technology of the present disclosure.

In the display control processing shown in FIG. 13 as an example, first, in step ST12, the acquisition unit 52A acquires the examination image 60 and the schema image 66 from the image database 14. After the processing in step ST12 is executed, the display control processing proceeds to step ST14.

In step ST14, the image generation unit 52B derives the contour line of the breast M based on the radiation image 62 included in the examination image 60 acquired in step ST12 by the acquisition unit 52A. After the processing in step ST14 is executed, the display control processing proceeds to step ST16.

In step ST16, the image generation unit 52B adjusts the contour line derived in step ST14 according to the size of the ultrasound image 64, and displays the contour line. After the processing in step ST16 is executed, the display control processing proceeds to step ST18.

In step ST18, the image generation unit 52B calculates the blind area 65 in the ultrasound image 64. After the processing in step ST18 is executed, the display control processing proceeds to step ST20.

In step ST20, the image generation unit 52B displays the blind area 65 calculated in step ST18 on the ultrasound image 64, and displays the blind area 67 on the MLO schema image 66A. After the processing in step ST20 is executed, the display control processing proceeds to step ST22.

In step ST22, the output unit 52C outputs the display image 68 generated by the image generation unit 52B to the display device 17. After the processing in step ST22 is executed, the display control processing proceeds to step ST24.

In step ST24, the acquisition unit 52A determines whether the designation of the region of interest in the display image 68 is received via the reception device 19. In a case in which the designation of the region of interest is received, an affirmative determination is made, and the display control processing proceeds to step ST26. In a case in which the designation of the region of interest is not received, a negative determination is made, and step ST24 is executed again.

In step ST26, the image generation unit 52B displays the position of the cross section on the radiation image 62 based on the cross section position information 80 corresponding to the position of the region of interest designated in step ST24. After the processing in step ST26 is executed, the display control processing proceeds to step ST28.

In step ST28, the image generation unit 52B displays the position of the cross section on the MLO schema image 66A and the compression schema image 66C based on the cross section position information 80. After the processing in step ST28 is executed, the display control processing proceeds to step ST30.

As shown in FIG. 14 as an example, in step ST30, the image generation unit 52B displays the position of the cross section on the ultrasound schema image 66D based on the cross section position information 80 and the MLO schema image 66A. After the processing in step ST30 is executed, the display control processing proceeds to step ST32.

In step ST32, the image generation unit 52B displays the position of the cross section on the CC schema image 66B based on the cross section position information 80 and the ultrasound schema image 66D. After the processing in step ST32 is executed, the display control processing proceeds to step ST34.

In step ST34, the output unit 52C outputs the display image 68 whose display is updated by the image generation unit 52B to the display device 17. After the processing in step ST34 is executed, the display control processing proceeds to step ST36.

In step ST36, the output unit 52C determines whether a condition for ending the display control processing (hereinafter, referred to as an "end condition") is satisfied. Examples of the end condition include a condition in which an instruction to end the display control processing is received. In step ST36, in a case in which the end condition is not satisfied, a negative determination is made, and the display control processing proceeds to step ST12. In step ST36, in a case in which the end condition is satisfied, an affirmative determination is made, and the display control processing ends.

As described above, in the medical support system 1 according to the technology of the present disclosure, the client terminal 16 comprises the processor 52, and in the processor 52, the acquisition unit 52A acquires the examination image 60 and the schema image 66. The examination image 60 includes the radiation image 62 and the ultrasound image 64. The ultrasound image 64 is obtained by being captured in a compressed state regarded as being the same as a compressed state in the radiographic imaging in which the radiation image 62 is obtained. The MLO schema image 66A is included in the schema image 66. The image generation unit 52B displays the position of the virtual cross section on the MLO schema image 66A based on the ultrasound image 64. Then, the output unit 52C displays the display image 68 on the display device 17. The display image 68 includes the examination image 60 and the MLO schema image 66A that displays the position of the virtual cross section.

In general, the radiographic imaging is suitable for the detection of the calcification in the breast M, but it is difficult to detect the tumor in a case in which a mammary gland density is high. On the other hand, in the ultrasound examination, it is difficult to detect the calcification, but it is possible to detect the tumor even in a case in which the mammary gland density is high. Therefore, by performing the ultrasound examination on the breast M of the same subject A in a compressed state regarded as being the same as a compressed state in the radiographic imaging, it is possible to detect the calcification and detect the tumor in the breast M having a high mammary gland density. In this case, the radiation image 62 and the ultrasound image 64 are obtained, and the images are compared with each other to perform the interpretation. Further, in a case in which the imaging technique of the radiographic imaging is the MLO imaging, the MLO schema image 66A as the schematic view corresponding to the radiation image 62 is used for entering a finding position in a case of the interpretation or the like. In the present configuration, the position of the virtual cross section is displayed on the radiation image 62 and the ultrasound image 64, and the position of the virtual cross section is further displayed on the MLO schema image 66A. As a result, in the examination image 60 and the schema image 66, it is easy to understand the positions of the virtual cross sections corresponding to each other, and the association between the examination image 60 and the schema image 66 is facilitated.

In addition, for example, in a case of the ultrasound image 64 obtained by the ultrasound examination in a state in which the breast M is compressed (hereinafter, also simply referred to as a "compression ultrasound examination"), unlike the appearance of the image obtained by a normal examination method performed by placing the ultrasound probe 42 on the breast M (hereinafter, also simply referred to as a "normal examination method"), it is difficult to associate the ultrasound image 64 with the radiation image 62 or the schema image 66. In the present configuration, the position of the virtual cross section is displayed on the radiation image 62 or the schema image 66 based on the position of the virtual cross section on the ultrasound image 64. As a result, even the ultrasound image 64 obtained by the ultrasound examination in a state in which the breast M is compressed, the association with the radiation image 62 and/or the schema image 66 is facilitated.

In the medical support system 1 according to the present embodiment, the ultrasound schema image 66D is included in the schema image 66 in the display image 68. The ultrasound schema image 66D is an image showing the schematic view corresponding to the ultrasound examination image of the normal examination method. The position of the virtual cross section of the ultrasound image 64 is displayed on the ultrasound schema image 66D. In general, the user 18 is more familiar with the schema of the normal examination method than the schema corresponding to the compression ultrasound examination. Therefore, by including the ultrasound schema image 66D that displays the position of the virtual cross section on the schema image 66, it is easy for the user 18 to understand the position of the virtual cross section on the ultrasound image 64.

In the medical support system 1 according to the present embodiment, in a case in which the region of interest is designated on the ultrasound image 64, the position corresponding to the region of interest is displayed on both the MLO schema image 66A and the ultrasound schema image 66D. As a result, since the position of the region of interest is displayed on the MLO schema image 66A and the ultrasound schema image 66D, the association of the position of the region of interest between the ultrasound image 64 and the MLO schema image 66A and the ultrasound schema image 66D is facilitated.

In the medical support system 1 according to the present embodiment, the position of the virtual cross section on the ultrasound schema image 66D is derived based on the position of the virtual cross section on the MLO schema image 66A and the depth from the body surface in the compression direction indicated by the cross section position information 80. Here, the depth from the body surface corresponds to the distance d1 of the virtual cross section indicated by the sagittal plane ultrasound image 64A from the body surface. The ultrasound image 64 obtained by the compression ultrasound examination has a different appearance from the image obtained by the normal examination method, and thus it is difficult to accurately associate the ultrasound image 64 with the radiation image 62 or the schema image 66. In the present configuration, the position of the virtual cross section on the ultrasound schema image 66D is derived based on the MLO schema image 66A and the depth indicated by the cross section position information 80. Therefore, the accuracy of the association between the positions of the virtual cross section is improved as compared with a case in which the user 18 performs the association based on the empirical rule.

In the medical support system 1 according to the present embodiment, the CC schema image 66B is included in the schema image 66 in the display image 68. The CC schema image 66B is an image showing the schematic view of the breast M in the CC imaging with a different imaging direction from the MLO imaging. The position of the virtual cross section of the ultrasound image 64 is displayed on the CC schema image 66B. In the radiographic imaging, in consideration of the influence on the subject A, the radiographic imaging (here, MLO imaging) may be performed only from one direction. Even in this case, in the present configuration, the virtual cross section is displayed on the CC schema image 66B, so that the user 18 can understand the position of the virtual cross section on the CC schema image 66B.

In the medical support system 1 according to the present embodiment, the position of the virtual cross section on the CC schema image 66B is derived based on the position of the virtual cross section on the ultrasound schema image 66D and the distance from the body surface in the front-rear direction of the subject A indicated by the cross section position information 80. Here, the distance in the front-rear direction corresponds to the distance d3 of the virtual cross section indicated by the coronal plane ultrasound image 64C from the body surface. In the present embodiment, since the CC schema image 66B is the schematic view of the breast M seen from the direction in which the imaging is not performed, there is no radiation image 62 corresponding to the CC schema image 66B, and it is difficult to associate the positions of the virtual cross section. In the present configuration, the position of the virtual cross section on the CC schema image 66B is derived based on the position of the virtual cross section of the ultrasound schema image 66D and the distance from the body surface in the front-rear direction. Therefore, the accuracy of the association between the positions of the virtual cross section is improved as compared with a case in which the user 18 performs the association of the position of the virtual cross section on the CC schema image 66B based on the empirical rule.

In the medical support system 1 according to the present embodiment, in the sagittal plane ultrasound image 64A, the blind area 65, which is the image region in which the breast M is not imaged in the compression ultrasound examination, is displayed in a form distinguishable from the other regions of the sagittal plane ultrasound image 64A. The ultrasound image 64 obtained by the compression ultrasound examination includes the image region in which the breast M is not imaged, unlike the ultrasound examination image in the normal examination method. In this case, the display ranges of the radiation image 62 and the ultrasound image 64 appear to be different from each other, and it is difficult to perform the association. In the present configuration, since the blind area 65 is displayed on the sagittal plane ultrasound image 64A, the association between the radiation image 62 and the sagittal plane ultrasound image 64A is facilitated.

In addition, in the medical support system 1 according to the present embodiment, in the MLO schema image 66A, the blind area 67, which is the image region in which the breast M is not imaged in the compression ultrasound examination, is displayed in a form distinguishable from the other regions of the MLO schema image 66A. In a case in which the ultrasound image 64 obtained by the compression ultrasound examination has a defect, the display ranges of the MLO schema image 66A and the ultrasound image 64 appear to be different from each other, and thus it is difficult to perform the association. In the present configuration, since the blind area 67 is displayed on the MLO schema image 66A, the association between the ultrasound image 64 and the MLO schema image 66A is facilitated.

In the medical support system 1 according to the present embodiment, the compression schema image 66C is included in the ultrasound schema image 66D in the display image 68. The compression schema image 66C is the schematic view showing a state in which the compression member 30 compresses the breast M. The compression schema image 66C displays the position of the virtual cross section on the ultrasound image 64. As a result, in the display image 68, the position of the virtual cross section in a state in which the breast M is compressed is easily understood. As a result, a correspondence relationship between the examination image 60 and the schema image 66 is easily understood.

In the medical support system 1 according to the present embodiment, the position of the virtual cross section displayed on the compression schema image 66C is derived based on the position of the virtual cross section on the ultrasound image 64. As a result, the accuracy of the position of the virtual cross section on the compression schema image 66C is improved as compared with a case in which the virtual cross section is displayed based on the empirical rule of the user 18.

In the medical support system 1 according to the present embodiment, the text box 90 is displayed on the display image 68. The text box 90 includes the text indicating the position of the region of interest. The position of the region of interest is shown as the intersection of the virtual cross sections. That is, the display image 68 displays the information indicating the depth of the intersection of the virtual cross sections. As a result, the information on the depth of the virtual cross section in the compression direction is displayed, so that the positions of the virtual cross section on the examination image 60 and the schema image 66 are easily understood.

In the medical support system 1 according to the present embodiment, the mark 82 indicating the position of the virtual cross section displayed on the MLO schema image 66A and the mark 84 indicating the position of the virtual cross section displayed on the compression schema image 66C are displayed by a solid line. Meanwhile, the mark 86 indicating the position of the virtual cross section displayed on the CC schema image 66B and the mark 88 indicating the position of the virtual cross section displayed on the ultrasound schema image 66D are displayed by a broken line. As a result, the virtual cross section displayed based on the position of the virtual cross section on the ultrasound image 64 and the position of the virtual cross section estimated from the other schema images can be distinguished from each other. As a result, the display accuracy of the position of the virtual cross section can be understood.

First Modification Example

In the above-described embodiment, the form example is described in which the imaging technique of the radiographic imaging is the MLO imaging, and the radiation image 62 is obtained by the MLO imaging, but the technology of the present disclosure is not limited to this. In the first modification example, the radiation image 62 is obtained by the CC imaging. Then, in the MLO schema image 66A as the schema in the direction in which the imaging is not performed, the image generation unit 52B displays the position of the virtual cross section. In the present modification example, the CC schema image 66B is an example of a "first schema image" according to the technology of the present disclosure, and the MLO schema image 66A is an example of a "third schema image" according to the technology of the present disclosure.

Figure 15:
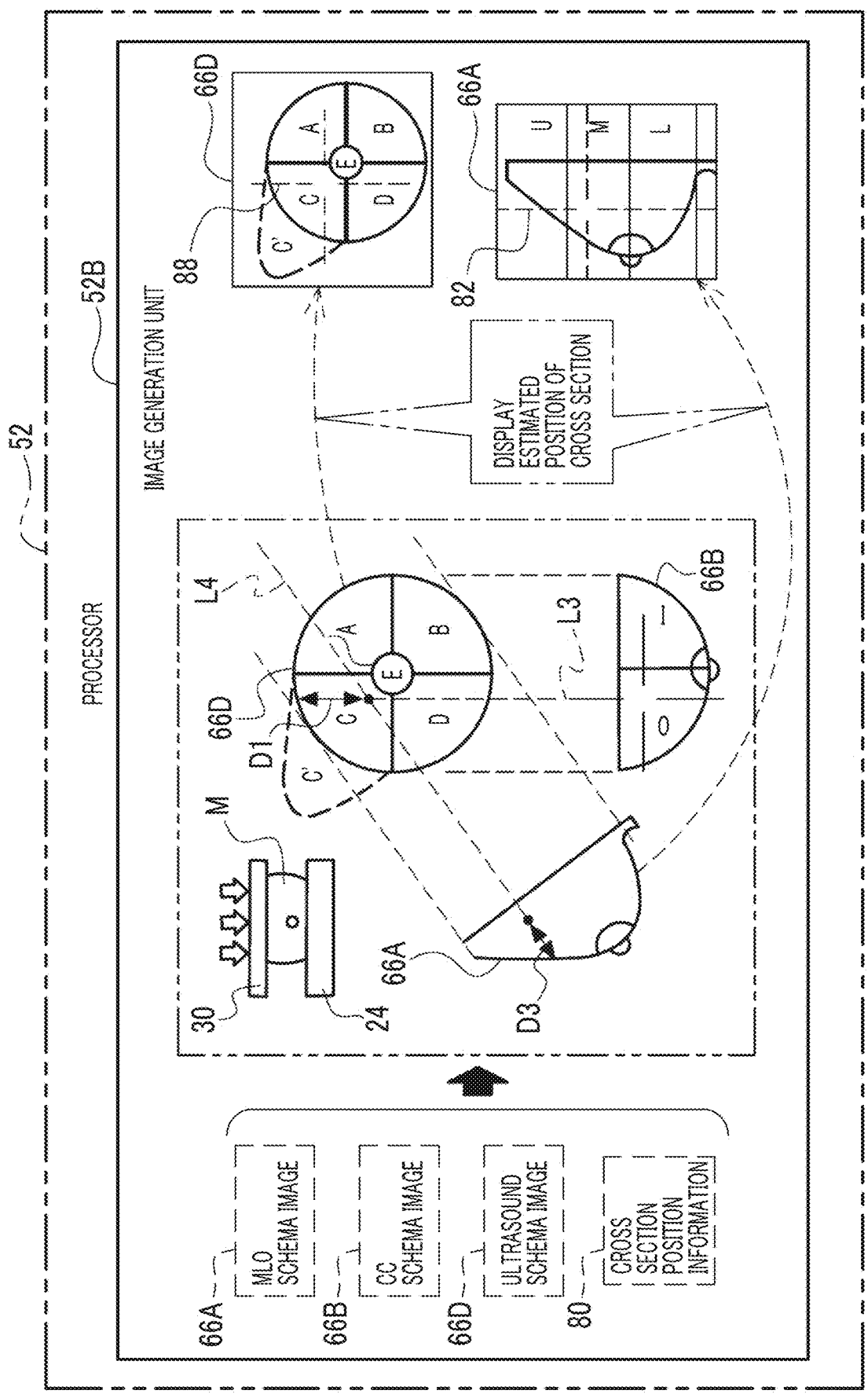
FIG. 15 is a conceptual diagram showing an example of main functions of the processor of the client terminal.

As shown in FIG. 15 as an example, the image generation unit 52B displays the position of the virtual cross section on the ultrasound schema image 66D based on the position of the virtual cross section on the CC schema image 66B and the cross section position information 80. Here, there is the geometrical positional relationship between the CC schema image 66B and the ultrasound schema image 66D. That is, as described above, the CC schema image 66B is the schematic view of the breast M seen from the compression direction in a state in which the breast M is compressed from above. The ultrasound schema image 66D is the schematic view of the breast M seen from the front side. Therefore, the CC schema image 66B is disposed below the ultrasound schema image 66D in the compression direction, and the left and right ends of the ultrasound schema image 66D and the CC schema image 66B are aligned. In such a disposition, in the ultrasound schema image 66D, the position of the intersection of the virtual cross sections is located on a straight line L3 extending from the position of the intersection of the virtual cross sections in the CC schema image 66B along the compression direction. The image generation unit 52B derives the straight line L3 based on the geometrical positional relationship between the CC schema image 66B and the ultrasound schema image 66D.

Further, the position of the intersection of the virtual cross sections in the ultrasound schema image 66D on the straight line L3 is determined by a depth D1 in the compression direction of the breast M. Here, the depth D1 is a depth of the virtual cross section indicated by the sagittal plane ultrasound image 64A from the body surface. As described above, the depth D1 corresponds to the distance d1 in the transverse plane ultrasound image 64B or the coronal plane ultrasound image 64C. The image generation unit 52B changes the distance d1 indicated by the cross section position information 80 according to the size of the ultrasound schema image 66D, to calculate the depth D1. In the ultrasound schema image 66D, a position separated from a boundary (that is, a surface of the breast M) on the straight line L3 by the depth D1 is estimated as the position of the intersection of the virtual cross sections. As a result, the position of the virtual cross section of the ultrasound schema image 66D is estimated.

The image generation unit 52B displays the position of the virtual cross section on the ultrasound schema image 66D based on the position of the virtual cross section on the CC schema image 66B and the cross section position information 80. Here, there is the geometrical positional relationship between the ultrasound schema image 66D and the MLO schema image 66A. That is, the MLO schema image 66A is a schematic view of the breast M seen from the compression direction in a state in which the breast M is compressed in a direction inclined in the cranio-caudal direction. In addition, the ultrasound schema image 66D is a schematic view of the breast M seen from the front side in a state in which the breast M is not compressed. Therefore, the MLO schema image 66A is disposed below (here, on the lower left side of) the ultrasound schema image 66D in the virtual compression direction of the MLO schema image 66A, and the positions of the upper and lower ends of the MLO schema image 66A and the ultrasound schema image 66D are aligned in the direction orthogonal to the compression direction of the breast M. In such a disposition, the position of the virtual cross section on the MLO schema image 66A is located on a straight line L4 extending from the intersection of the virtual cross sections in the ultrasound schema image 66D along the compression direction. The image generation unit 52B derives the straight line L4 based on the geometrical positional relationship between the ultrasound schema image 66D and the MLO schema image 66A.

Further, the position of the intersection of the virtual cross sections in the MLO schema image 66A on the straight line L4 is determined by a distance D3 from the body surface. Here, the distance D3 is a distance of the virtual cross section indicated by the coronal plane ultrasound image 64C from the body surface. The distance D3 corresponds to the distance d3 in the sagittal plane ultrasound image 64A. The image generation unit 52B changes the distance d3 indicated by the cross section position information 80 according to the size of the MLO schema image 66A, to calculate the distance D3. In the MLO schema image 66A, a position separated from a boundary (that is, a front side surface of the breast M) on the straight line L4 by the distance D3 is estimated as the position of the intersection of the virtual cross sections. As a result, the position of the virtual cross section of the MLO schema image 66A is estimated.

The image generation unit 52B displays the position of the virtual cross section on the ultrasound schema image 66D and the MLO schema image 66A. In the example shown in FIG. 15, the marks 82 and 88 of the broken lines are respectively displayed on the ultrasound schema image 66D and the MLO schema image 66A.

Figure 16:
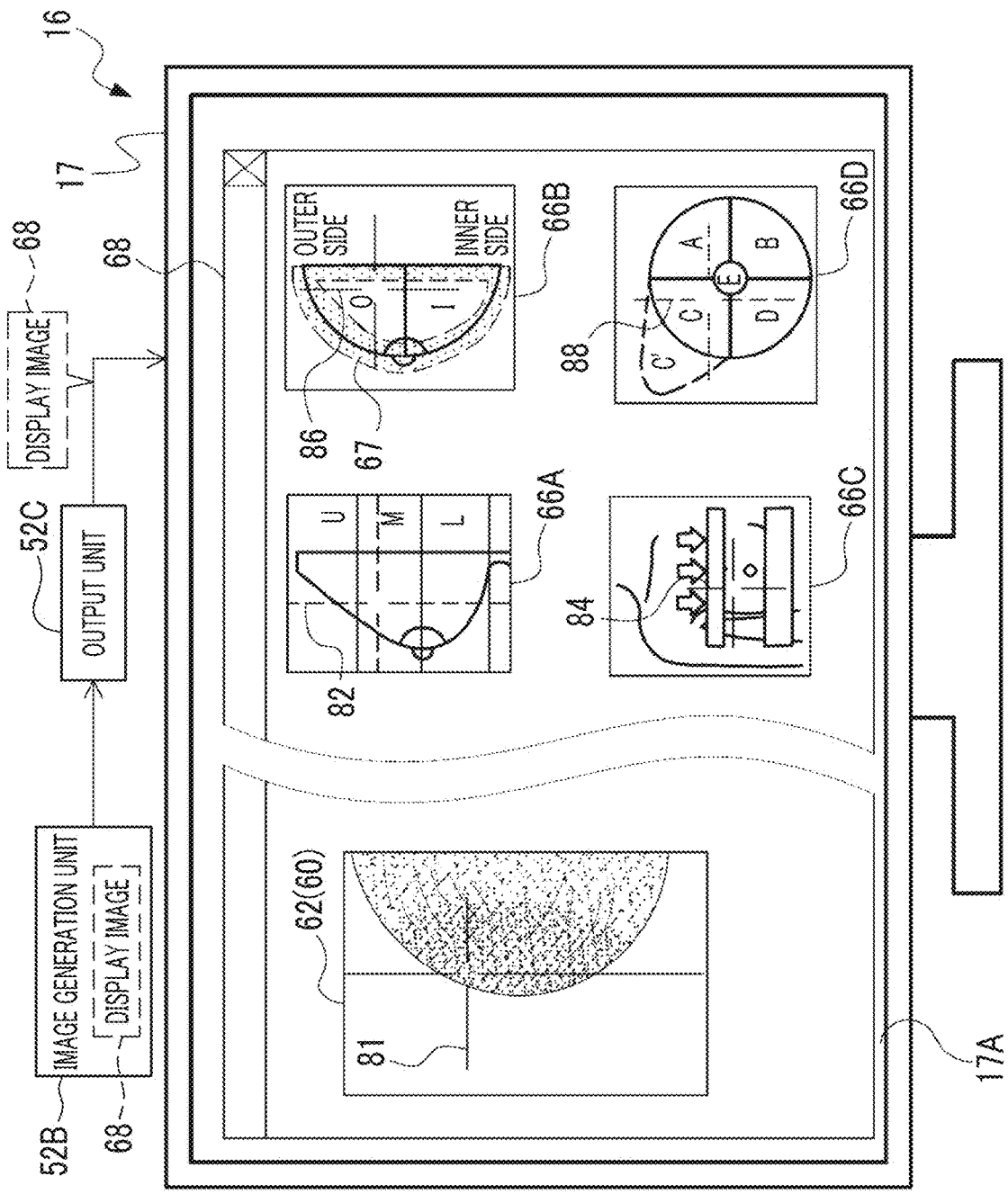
FIG. 16 is a conceptual diagram showing an example of main functions of the processor of the client terminal.

As shown in FIG. 16 as an example, the image generation unit 52B generates the display image 68 including the examination image 60 that displays the position of the virtual cross section and the schema image 66 that displays the position of the virtual cross section. The image generation unit 52B outputs the generated display image 68 to the output unit 52C, and the output unit 52C displays the display image 68 on the display device 17 by performing the GUI control for displaying the display image 68.

In the example shown in FIG. 16, in the display image 68, the mark 81 is displayed on the radiation image 62 obtained by the CC imaging by designating the region of interest via the pointer 70 (see FIG. 12).

In addition, the mark 82 is displayed on the MLO schema image 66A by designating the region of interest via the pointer 70 on the display image 68. The mark 84 is also displayed on the compression schema image 66C.

Further, the mark 86 is displayed on the CC schema image 66B by designating the region of interest via the pointer 70 on the display image 68. The mark 88 is also displayed on the ultrasound schema image 66D.

The marks 81, 82, 84, 86, and 88 each indicate the position of the virtual cross section of the ultrasound image 64 in the displayed image, and the position of the intersection of the cross-shaped mark 84 indicates the position of the region of interest. In addition, in the schema image 66, the marks 84 and 86 indicating the position of the virtual cross section indicated by the cross section position information 80 are shown by a solid line, and the marks 82 and 88 indicating the position of the virtual cross section estimated by the image generation unit 52B are shown by a broken line, and the marks 84 and 86 and the marks 82 and 88 can be distinguished from each other.

Since the radiation image 62 is obtained by the CC imaging, the blind area 67 is displayed on the CC schema image 66B. That is, the contour line is calculated from the radiation image 62, the calculated contour line is reflected in the ultrasound image 64, and as a result, the blind area 65 in the ultrasound image 64 is obtained. Then, the blind area 65 in the ultrasound image 64 is adjusted according to the size of the CC schema image 66B, and the blind area 67 is displayed on the CC schema image 66B.

As described above, in the first modification example, the position of the virtual cross section on the ultrasound schema image 66D is derived based on the position of the virtual cross section on the CC schema image 66B and the depth from the body surface in the compression direction indicated by the cross section position information 80. Here, the depth from the body surface corresponds to the distance d1 of the virtual cross section indicated by the sagittal plane ultrasound image 64A from the body surface. The ultrasound image 64 obtained by the compression ultrasound examination has a different appearance from the image obtained by the normal examination method, and thus it is difficult to accurately associate the ultrasound image 64 with the radiation image 62 or the schema image 66. In the present configuration, the position of the virtual cross section on the ultrasound schema image 66D is derived based on the CC schema image 66B and the depth indicated by the cross section position information 80. Therefore, the accuracy of the association between the positions of the virtual cross section is improved as compared with a case in which the user 18 performs the association based on the empirical rule.

In addition, in the first modification example, the position of the virtual cross section on the MLO schema image 66A is derived based on the position of the virtual cross section on the ultrasound schema image 66D and the distance from the body surface in the front-rear direction of the subject A indicated by the cross section position information 80. In the present modification example, since the MLO schema image 66A is the schematic view of the breast M seen from the direction in which the imaging is not performed, there is no radiation image 62 corresponding to the MLO schema image 66A, and it is difficult to associate the positions of the virtual cross section. In the present configuration, the position of the virtual cross section on the MLO schema image 66A is derived based on the position of the virtual cross section of the ultrasound schema image 66D and the distance from the body surface in the front-rear direction. Therefore, the accuracy of the association between the positions of the virtual cross section is improved as compared with a case in which the user 18 performs the association of the position of the virtual cross section on the MLO schema image 66A based on the empirical rule.

Second Modification Example

In the above-described embodiment, the form example is described in which only one of the MLO imaging or the CC imaging is performed in the radiographic imaging, but the technology of the present disclosure is not limited to this. In the second modification example, as the imaging technique of the radiographic imaging, both the MLO imaging and the CC imaging are performed, and the radiation image 62 is obtained by each imaging technique. The position of the virtual cross section of the ultrasound schema image 66D is displayed based on the MLO schema image 66A and the CC schema image 66B.

Figure 17:
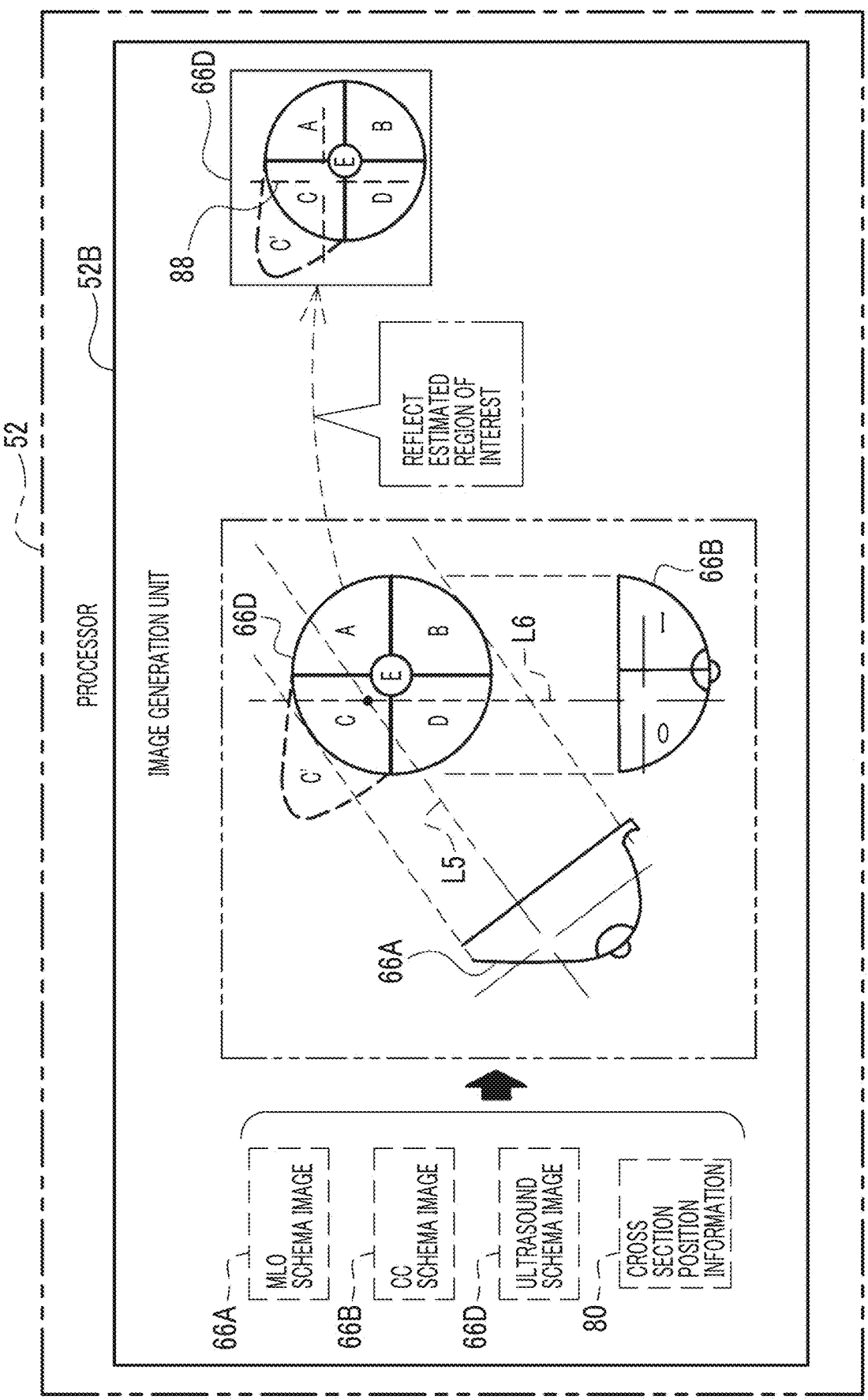
FIG. 17 is a conceptual diagram showing an example of main functions of the processor of the client terminal.

As shown in FIG. 17 as an example, the image generation unit 52B displays the position of the virtual cross section on the MLO schema image 66A and the CC schema image 66B based on the cross section position information 80.

The image generation unit 52B displays the position of the virtual cross section on the ultrasound schema image 66D based on the position of the virtual cross section on the MLO schema image 66A and the position of the virtual cross section on the CC schema image 66B. As described above, there is the geometrical positional relationship between the MLO schema image 66A and the ultrasound schema image 66D. The MLO schema image 66A is disposed below (here, on the lower left side of) the ultrasound schema image 66D in the compression direction, and the positions of the upper and lower ends of the MLO schema image 66A and the ultrasound schema image 66D are aligned in the direction orthogonal to the compression direction of the breast M. In such a disposition, in the ultrasound schema image 66D, the position of the virtual cross section is located on a straight line L5 extending from an intersection of the virtual cross sections in the MLO schema image 66A along the compression direction.

In addition, there is the geometrical positional relationship between the CC schema image 66B and the ultrasound schema image 66D. The CC schema image 66B is disposed below the ultrasound schema image 66D in the compression direction, and the left and right ends of the ultrasound schema image 66D and the CC schema image 66B are aligned. In such a disposition, in the ultrasound schema image 66D, the position of the intersection of the virtual cross sections is located on a straight line L6 extending from the position of the intersection of the virtual cross sections in the CC schema image 66B along the compression direction.

In addition, it is estimated that the position of the virtual cross section on the ultrasound schema image 66D is located at the intersection between the straight line L5 and the straight line L6. The image generation unit 52B estimates the position of the virtual cross section on the ultrasound schema image 66D by using the relationship described above. As a result, the position of the virtual cross section of the ultrasound schema image 66D is estimated.

The image generation unit 52B displays the position of the virtual cross section on the ultrasound schema image 66D. In the example shown in FIG. 17, the mark 88 of a broken line is displayed on each ultrasound schema image 66D.

Figure 18:
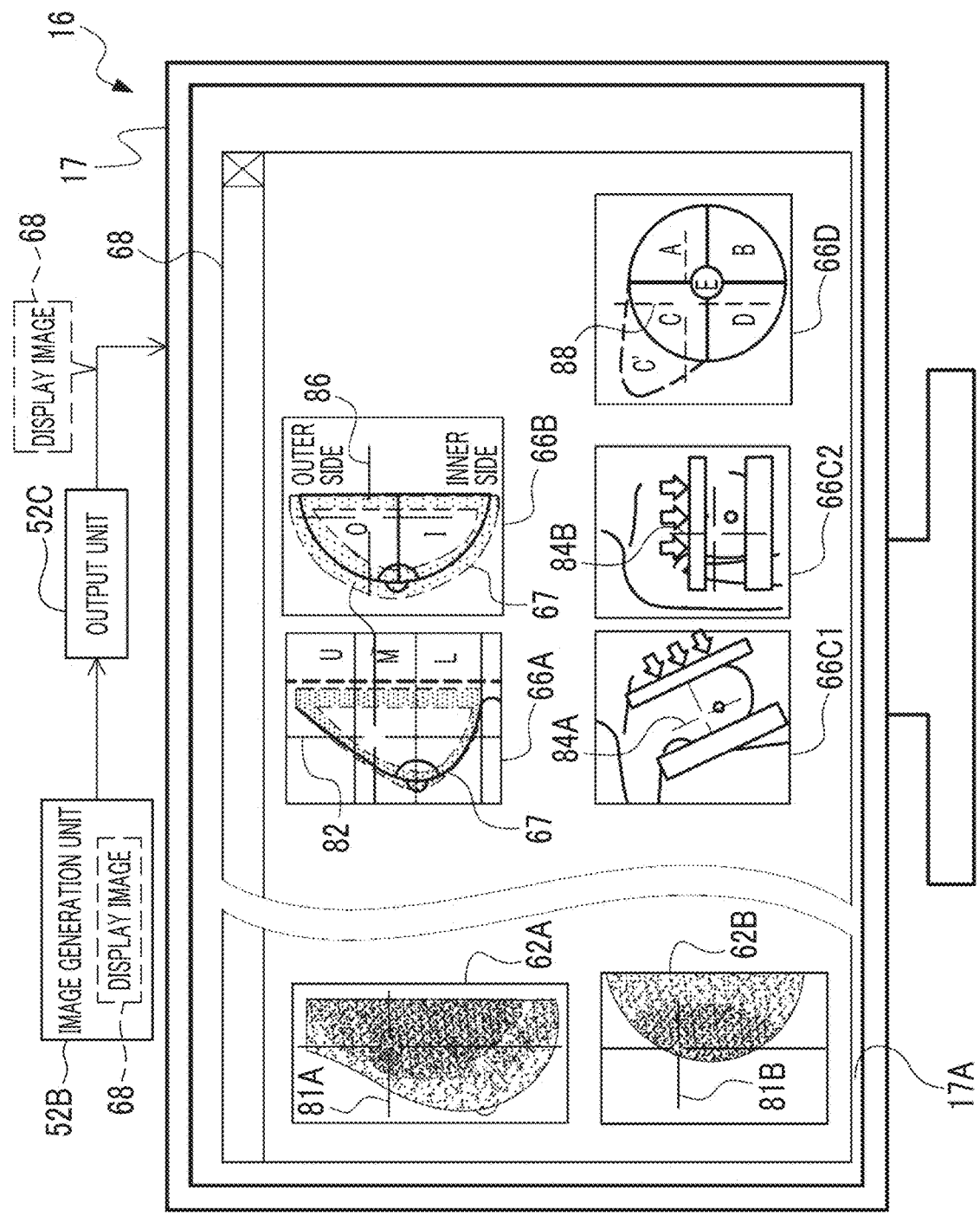
FIG. 18 is a conceptual diagram showing an example of main functions of the processor of the client terminal.

As shown in FIG. 18 as an example, the image generation unit 52B generates the display image 68 including the examination image 60 that displays the position of the virtual cross section and the schema image 66 that displays the position of the virtual cross section. The image generation unit 52B outputs the generated display image 68 to the output unit 52C, and the output unit 52C displays the display image 68 on the display device 17 by performing the GUI control for displaying the display image 68.

In the example shown in FIG. 18, in the display image 68, a mark 81A is displayed on a radiation image 62A obtained by the MLO imaging by designating the region of interest via the pointer 70 (see FIG. 12). In the present modification example, the radiation image 62A obtained by the MLO imaging is an example of a "first radiation image" according to the technology of the present disclosure. In addition, a mark 81B is displayed on a radiation image 62B obtained by the CC imaging. That is, the marks 81A and 81B are displayed by the image generation unit 52B based on the cross section position information 80 indicating the position of the virtual cross section on the ultrasound image 64. In the present modification example, the radiation image 62B obtained by the CC imaging is an example of a "second radiation image" according to the technology of the present disclosure.

In addition, the mark 82 is displayed on the MLO schema image 66A by designating the region of interest via the pointer 70 on the display image 68. The MLO schema image 66A corresponds to the radiation image 62A obtained by the MLO imaging.

In addition, a mark 84A is displayed on a compression schema image 66C1 showing an aspect of the compression in the MLO imaging. Further, a mark 84B is shown in the compression schema image 66C2 showing the aspect of the compression in the CC imaging.

Further, the mark 86 is displayed on the CC schema image 66B by designating the region of interest via the pointer 70 on the display image 68. The CC schema image 66B corresponds to the radiation image 62B obtained by the CC imaging. The mark 88 is also displayed on the ultrasound schema image 66D.

The marks 81, 82, 84A, 84B, 86, and 88 each indicate the position of the virtual cross section of the ultrasound image 64 in the displayed image, and the position of the intersection of the cross-shaped mark 84 indicates the position of the region of interest. In addition, in the schema image 66, the marks 82, 84, 84A, 84B, and 86 indicating the position of the virtual cross section indicated by the cross section position information 80 are shown by a solid line, and the mark 88 indicating the position of the virtual cross section estimated by the image generation unit 52B are shown by a broken line, and the marks 82, 84, 84A, 84B, and 86 and the mark 88 can be distinguished from each other.

In addition, since the radiation image 62 is obtained by both the MLO imaging and the CC imaging, the blind area 67 is displayed on each of the MLO schema image 66A and the CC schema image 66B.

As described above, in the second modification example, the position of the virtual cross section on the ultrasound schema image 66D is derived based on the positions of the virtual cross section on the MLO schema image 66A and the CC schema image 66B. As a result, the accuracy of the position of the virtual cross section on the ultrasound schema image 66D is improved as compared with a case in which the position of the virtual cross section on the ultrasound schema image 66D is displayed based on the empirical rule of the user 18.

In the second modification example, in the MLO schema image 66A and the CC schema image 66B, the position of the virtual cross section is displayed based on the cross section position information 80. As a result, the accuracy of the positions of the virtual cross section on the MLO schema image 66A and the CC schema image 66B are improved. As a result, the accuracy of the position of the virtual cross section on the ultrasound schema image 66D in which the position of the virtual cross section is estimated based on these positions is also improved.

Third Modification Example

In the third modification example, in a case in which, in the display image 68, the position of the virtual cross section displayed on the schema image 66 is changed by the user 18, a display aspect of the virtual cross section after the change is distinguishable from a display aspect before the change.

Figure 19:
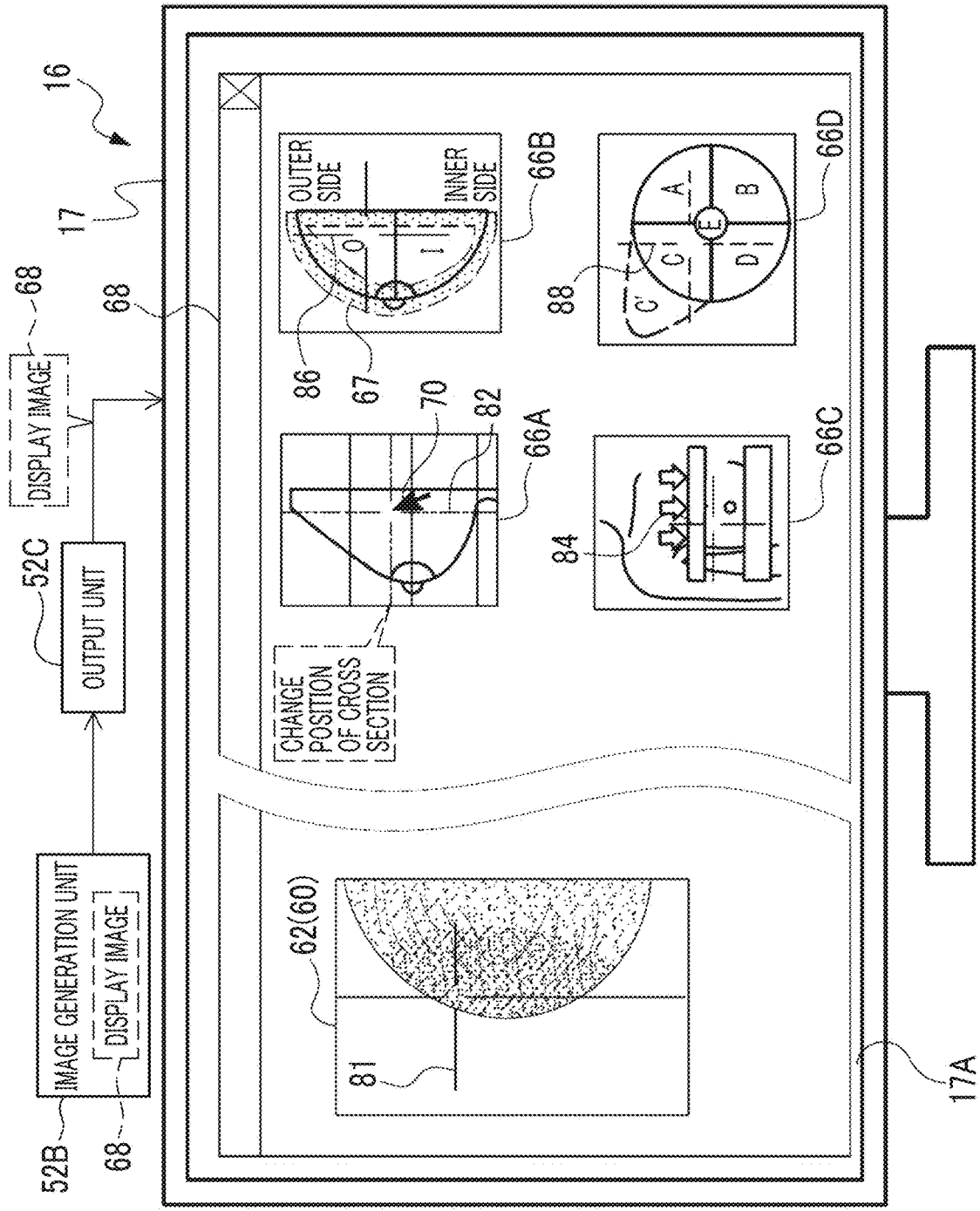
FIG. 19 is a conceptual diagram showing an example of main functions of the processor of the client terminal.

As shown in FIG. 19 as an example, in the display image 68, the position of the virtual cross section displayed on the schema image 66 is changed by receiving the operation from the user 18 via the reception device 19. For example, the user 18 corrects the position of the virtual cross section displayed in advance on the schema image 66. In the example shown in FIG. 19, the mark 82 displayed on the MLO schema image 66A is moved to the lower right via the pointer 70. The position of each line segment of the mark 82 indicates the position of the virtual cross section, and thus the position of the virtual cross section is changed by moving the mark 82. The display aspect of the mark 82 after the virtual cross section is changed is a two-dot chain line. That is, the two-dot chain line, which is the display aspect of the mark 82 after the change, is displayed in a form distinguishable from a broken line before the change.

Here, the form example is described in which the position of the virtual cross section is changed in the MLO schema image 66A, but this is merely an example. The positions of the virtual cross section on the CC schema image 66B, the compression schema image 66C, and the ultrasound schema image 66D may be changed.

In addition, the aspect is described in which the line type of the mark 82 is changed after the position of the virtual cross section is changed, but this is merely an example. It is sufficient that the display aspects before and after the change can be distinguished from each other, and an aspect may be adopted in which the thickness and/or the color is changed instead of the line type. In addition, a text indicating the change may be displayed, or an aspect may be adopted in which the mark is changed to a mark of another form (for example, a circle).

As described above, in the third modification example, in a case in which the position of the virtual cross section is changed in the schema image 66, the display aspect of the position of the virtual cross section after the change is displayed in a form distinguishable from the display aspect before the change. As a result, it is easy to distinguish that the virtual cross section is changed by the user 18 in the schema image 66. For example, the position of the virtual cross section estimated by the image generation unit 52B may be different from the position of the virtual cross section considered by the user 18. In this case, the position of the virtual cross section on the schema image 66 may be changed by the user 18, and in the present configuration, it is possible to easily understand that the position of the virtual cross section is changed.

Fourth Modification Example

Figure 20:
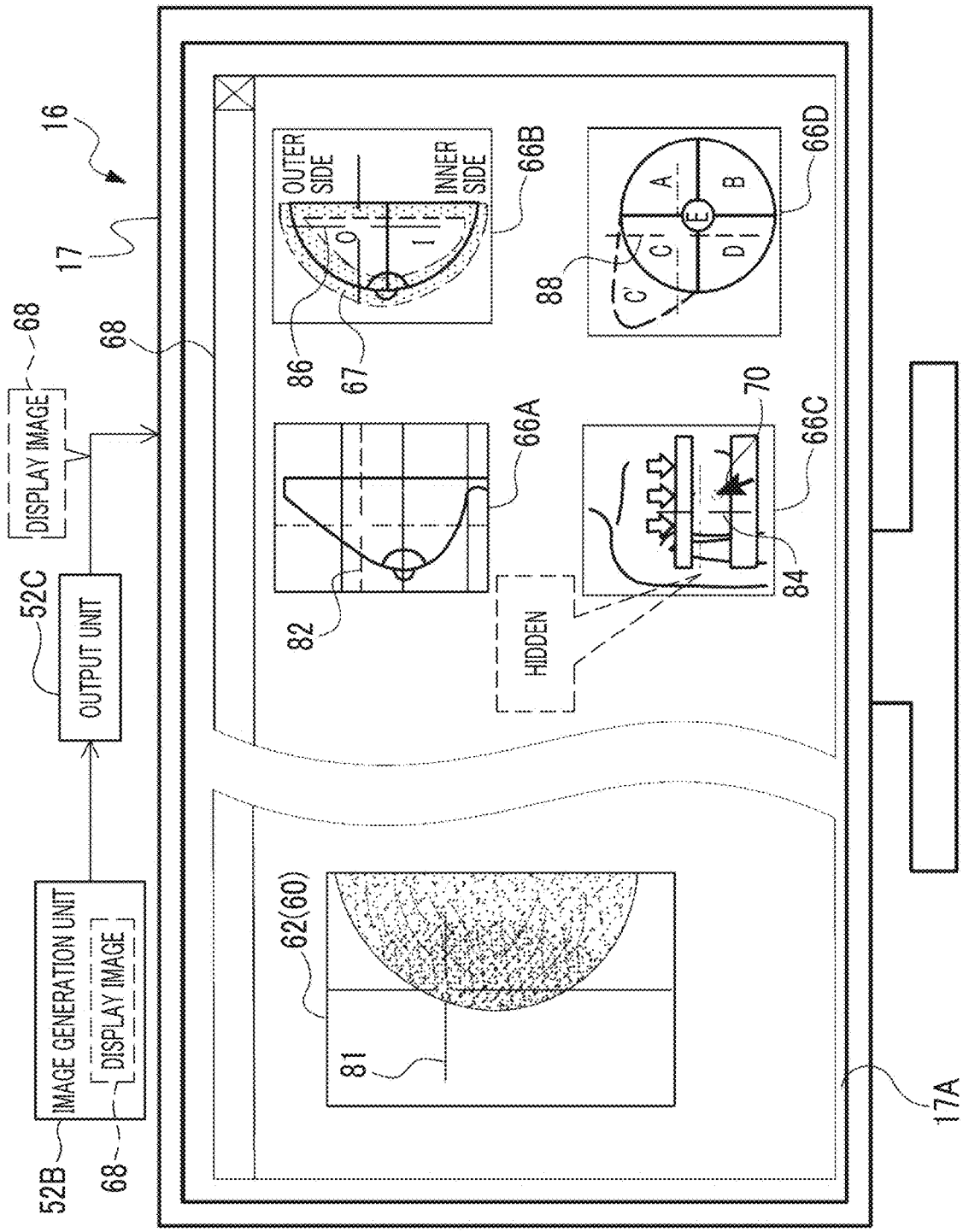
FIG. 20 is a conceptual diagram showing an example of main functions of the processor of the client terminal.

In the fourth modification example, the display content is switchable in the compression schema image 66C. As an example, as shown in FIG. 20, a position of a nipple of the breast M is hidden on the compression schema image 66C. Specifically, in a case in which the nipple is not clearly shown in the radiation image 62 and/or the ultrasound image 64, the nipple can be hidden on the compression schema image 66C. In the example shown in FIG. 20, the nipple is hidden by selecting an image region showing the nipple via the pointer 70 in the compression schema image 66C.

In addition, in the compression schema image 66C, a part of the line segments of the cross-shaped mark 84 is hidden. In a case in which the position of the virtual cross section is displayed by the image generation unit 52B and the position of the virtual cross section is inaccurate, it may be easier to perform the association with the other images by hiding the position of the virtual cross section. In the example shown in FIG. 20, in the compression schema image 66C, the line segment corresponding to the position of the cross section indicated by the transverse plane ultrasound image 64B in the mark 84 is selected via the pointer 70, so that a part of the line segments of the mark 84 is hidden.

As described above, in the fourth modification example, the display content is switchable in the compression schema image 66C, so that the user 18 can change the display content of the compression schema image 66C.

It should be noted that, in the above-described embodiment, the form example is described in which the region of interest is designated by the user 18, but the technology of the present disclosure is not limited to this. For example, the designation of the region of interest may be performed based on a detection result of the region of interest (for example, the lesion) obtained by the image recognition processing (for example, the image recognition processing of the artificial intelligence (AI) method) on the radiation image 62 and/or the ultrasound image 64.

In addition, in the above-described embodiment, the form example is described in which the display image 68 is displayed to the user 18, but the technology of the present disclosure is not limited to this. For example, an aspect may be adopted in which the information indicating the display image 68 is output to a printer apparatus and printed, or an aspect may be adopted in which the display image 68 is output to an external device (for example, an external server) and used in processing of creating an interpretation report in the external device.

In addition, in each embodiment described above, the form example is described in which the display control processing is performed by the processor 52 of the client terminal 16, but the technology of the present disclosure is not limited to this, and the device that performs the display control processing may be provided outside the client terminal 16.

Figure 21:
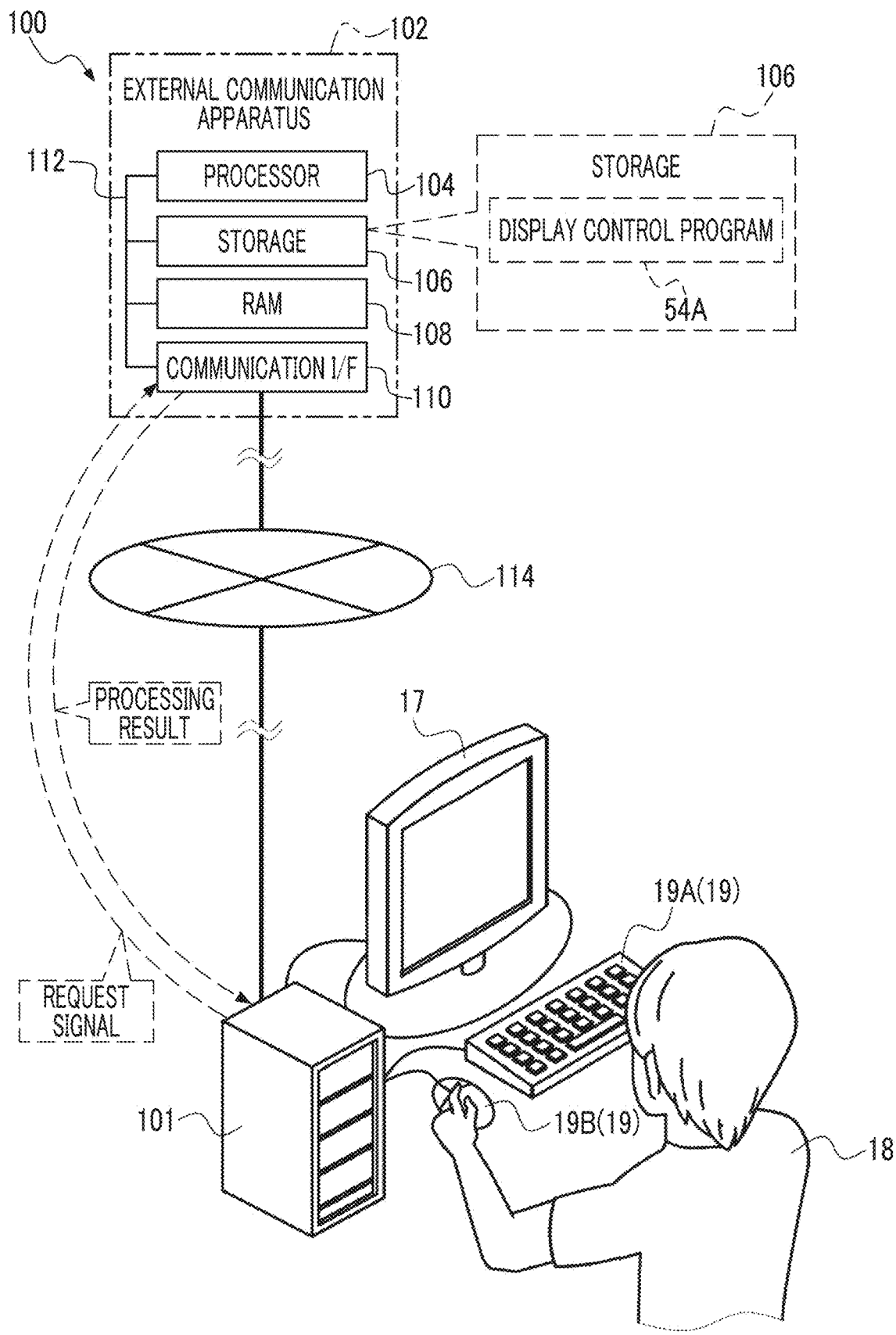
FIG. 21 is a conceptual diagram showing a configuration example of the medical support system.

In this case, as shown in FIG. 21 as an example, a medical support system 100 need only be used. The medical support system 100 comprises an information processing apparatus 101 and an external communication apparatus 102. The information processing apparatus 101 is an apparatus in which the display control program 54A is excluded from the storage 54 of the computer 50 included in the client terminal 16 according to the above-described embodiment. The external communication apparatus 102 is, for example, a server.

The server is realized, for example, by a main frame. Here, the mainframe is described as an example, but this is merely an example, but the server may be realized by a cloud computing or may be realized by network computing such as fog computing, edge computing, or grid computing. Here, the server is described as an example of the external communication apparatus 102, but this is merely an example, and at least one personal computer or the like may be used as the external communication apparatus 102 instead of the server.

The external communication apparatus 102 comprises a processor 104, a storage 106, a RAM 108, and a communication I/F 110, and the processor 104, the storage 106, the RAM 108, and the communication I/F 110 are connected by a bus 112. The communication I/F 110 is connected to the information processing apparatus 101 via a network 114. The network 114 is, for example, the Internet. It should be noted that the network 114 is not limited to the Internet, but may be a WAN and/or a LAN such as an intranet.

The storage 106 stores the display control program 54A. The processor 104 executes the display control program 54A on the RAM 108. The processor 104 performs the display control processing according to the display control program 54A executed on the RAM 108.

The information processing apparatus 101 transmits a request signal for requesting the external communication apparatus 102 to perform the display control processing. The communication I/F 110 of the external communication apparatus 102 receives the request signal via the network 114. The processor 104 performs the display control processing according to the display control program 54A and transmits a processing result to the information processing apparatus 101 via the communication I/F 110. The information processing apparatus 101 receives the processing result (for example, the processing result of the image generation unit 52B) transmitted from the external communication apparatus 102 via the communication I/F 58 (see FIG. 4), and outputs the received processing result to various devices, such as the display device 17.

It should be noted that, in the example shown in FIG. 21, the external communication apparatus 102 is an example of a "medical support device" according to the technology of the present disclosure, and the processor 104 is an example of a "processor" according to the technology of the present disclosure.

The display control processing may be distributed and performed by a plurality of devices including the information processing apparatus 101 and the external communication apparatus 102.

In addition, in the above-described embodiment, the form example is described in which the display control program 54A is stored in the storage 54, but the technology of the present disclosure is not limited to this. For example, the display control program 54A may be stored in a storage medium (not shown) such as an SSD or a USB memory. The storage medium is a portable computer-readable non-transitory storage medium. The display control program 54A stored in the storage medium is installed in the client terminal 16. The processor 52 executes the display control processing according to the display control program 54A.

The display control program 54A may be stored in a storage device of another computer or another server connected to the client terminal 16 via a network, and the display control program 54A may be downloaded in response to a request of the client terminal 16 and installed in the client terminal 16. That is, the program (that is, a program product) described in the present embodiment may be provided by using the recording medium or may be distributed from an external computer.

It is not necessary to store the entire display control program 54A in the storage device of the other computer or the other server connected to the client terminal 16 or the storage 54, and a part of the display control program 54A may be stored. It should be noted that the storage medium, the storage device of the other computer or the other server connected to the client terminal 16, and another external storage are positioned as a memory used by being directly or indirectly connected to the processor 52.

Moreover, in the above-described embodiment, in the client terminal 16, the computer 50 is described as an example, but the technology of the present disclosure is not limited to this, and a device including an application specific integrated circuit (ASIC), a field-programmable gate array (FPGA), and/or a programmable logic device (PLD) may be applied instead of the computer 50. Also, a combination of a hardware configuration and a software configuration may be used instead of the computer 50.

As a hardware resource for performing the display control processing described in the embodiment, the following various processors can be used. Examples of the processor include a CPU which is a general-purpose processor functioning as the hardware resource for performing the display control processing by performing software, that is, a program. Examples of the processor include a dedicated electric circuit that is a processor having a circuit configuration specially designed for executing specific processing, such as an FPGA, a PLD, or an ASIC. A memory is built in or connected to any processor, and any processor performs the display control processing by using the memory.

The hardware resource for performing the display control processing may be composed of one of these various processors, or may be composed of a combination (for example, a combination of a plurality of FPGAs or a combination of a CPU and an FPGA) of two or more processors of the same type or different types. In addition, the hardware resource for performing the display control processing may be one processor.

As a configuring example of one processor, first, there is a form in which one processor is composed of a combination of one or more CPUs and software and the processor functions as the hardware resource for performing the display control processing. Second, as represented by system-on-a-chip (SoC), there is a form in which a processor that realizes the functions of the entire system including a plurality of hardware resources for executing the display control processing with a single integrated circuit (IC) chip is used. As described above, the display control processing is realized by using one or more of the various processors as the hardware resources.

As the hardware structures of various processors, more specifically, an electronic circuit in which circuit elements, such as semiconductor elements, are combined can be used. The display control processing is merely an example. Therefore, it goes without saying that unnecessary steps may be deleted, new steps may be added, or the process order may be changed, without departing from the gist.

The described contents and the shown contents are the detailed description of the parts according to the technology of the present disclosure, and are merely examples of the technology of the present disclosure. For example, the description of the configuration, the function, the action, and the effect are the description of examples of the configuration, the function, the action, and the effect of the parts according to the technology of the present disclosure. Accordingly, it is needless to say that unnecessary parts may be deleted, new elements may be added, or replacements may be made with respect to the described contents and the shown contents within a range that does not deviate from the gist of the technology of the present disclosure. In addition, in order to avoid complications and facilitate understanding of the parts according to the technology of the present disclosure, the description of common technical knowledge or the like, which does not particularly require the description for enabling the implementation of the technology of the present disclosure, is omitted in the described contents and the shown contents.

All documents, patent applications, and technical standards described in the present specification are incorporated into the present specification by reference to the same extent as in a case in which the individual documents, patent applications, and technical standards are specifically and individually stated to be described by reference.

Regarding the above-described embodiment, the following additional notes are further disclosed.

Additional Note 1

A medical support device comprising: a processor, in which the processor is configured to: acquire an examination image that is an image including a radiation image obtained by performing radiographic imaging of a breast in a state of being compressed by a compression member and a plurality of ultrasound images captured in a state in which the breast is compressed by the compression member in a compressed state regarded as being the same as a compressed state in the radiation image, and that displays a position of a virtual cross section on each of the ultrasound image and the radiation image, and a schema image including a first schema image as an image that shows a first schema as a schematic view showing the breast in the radiographic imaging and that displays a position of the virtual cross section based on the ultrasound image; and execute display control of displaying a display image including the examination image and the schema image.

Additional Note 2

The medical support device according to additional note 1, in which the schema image further includes a second schema image, and the second schema image is an image that shows a second schema as a schematic view corresponding to an ultrasound examination image of an examination method performed by placing a probe on the breast and that displays a position of the virtual cross section.

Additional Note 3

The medical support device according to additional note 2, in which, in a case in which a region of interest is designated on at least any one of the ultrasound image or the radiation image, the region of interest is displayed at a corresponding position in both the first schema image and the second schema image.

Additional Note 4

The medical support device according to additional note 2 or 3, in which the position of the virtual cross section on the second schema image is derived based on the position of the virtual cross section on the first schema and a depth of the virtual cross section in a compression direction in the ultrasound image.

Additional Note 5

The medical support device according to any one of additional notes 2 to 4, in which the schema image further includes a third schema image, and the third schema image is an image that shows a third schema as a schematic view of the breast in the radiographic imaging in which an imaging direction is different from an imaging direction in a case of the first schema and that displays a position of the virtual cross section.

Additional Note 6

The medical support device according to additional note 5, in which the position of the virtual cross section on the third schema image is derived based on the position of the virtual cross section on the second schema and a distance of the virtual cross section in the ultrasound image from a body surface of a subject in a front-rear direction.

Additional Note 7

The medical support device according to additional note 5 or 6, in which the radiation image includes a first radiation image and a second radiation image obtained in an imaging direction different from an imaging direction of the first radiation image, the first schema image corresponds to the first radiation image, the third schema image corresponds to the second radiation image, and the position of the virtual cross section on the second schema image is derived based on the positions of the virtual cross section on the first schema image and the third schema image.

Additional Note 8

The medical support device according to additional note 7, in which the position of the virtual cross section on the third schema image is displayed based on the ultrasound image.

Additional Note 9

The medical support device according to any one of additional notes 1 to 8, in which, in the ultrasound image, a first blind area as an image region in which the breast is not imaged in an ultrasound examination is displayed in a form distinguishable from other regions.

Additional Note 10

The medical support device according to any one of additional notes 1 to 9, in which, in the schema image, a second blind area as an image region in which the breast is not imaged in an ultrasound examination is displayed in a form distinguishable from other regions.

Additional Note 11

The medical support device according to any one of additional notes 1 to 10, in which the schema image further includes a fourth schema image, and the fourth schema image is an image that shows a fourth schema as a schematic view showing a state in which the compression member compresses the breast and that displays a position of the virtual cross section.

Additional Note 12

The medical support device according to additional note 11, in which the position of the virtual cross section on the fourth schema image is derived based on the position of the virtual cross section on the ultrasound image.

Additional Note 13

The medical support device according to any one of additional notes 1 to 12, in which the display image further displays information on a depth of an intersection of the virtual cross sections in a compression direction of the breast.

Additional Note 14

The medical support device according to any one of additional notes 1 to 13, in which, in a case in which the virtual cross section displayed on the schema image based on the position of the virtual cross section on the ultrasound image is defined as a first virtual cross section, a display aspect of a position of the first virtual cross section has a display aspect distinguishable from a second virtual cross section that is a virtual cross section estimated based on the position of the first virtual cross section displayed on the schema image and that is displayed on an image different from an image in which the first virtual cross section is displayed.

Additional Note 15

The medical support device according to any one of additional notes 1 to 14, in which, in a case in which the position of the virtual cross section displayed on the schema image is changed, the virtual cross section after the change has a display aspect distinguishable from the virtual cross section before the change.

Additional Note 16

A medical image capturing system comprising: the medical support device according to any one of additional notes 1 to 15; a radiography apparatus; and an ultrasonography apparatus.

What is claimed is:

1. A medical support device comprising:
a processor,
wherein the processor is configured to:
   acquire
      an examination image that is an image including a radiation image obtained by performing radiographic imaging of a breast in a state of being compressed by a compression member and a plurality of ultrasound images captured in a state in which the breast is compressed by the compression member in a compressed state regarded as being the same as a compressed state in the radiation image, and that displays a position of a virtual cross section on each of the ultrasound image and the radiation image, and
      a schema image including a first schema image as an image that shows a first schema as a schematic view showing the breast in the radiographic imaging and that displays a position of the virtual cross section based on the ultrasound image; and
   execute display control of displaying a display image including the examination image and the schema image.

2. The medical support device according to claim 1, wherein the schema image further includes a second schema image, and
the second schema image is an image that shows a second schema as a schematic view corresponding to an ultrasound examination image of an examination method performed by placing a probe on the breast and that displays a position of the virtual cross section.

3. The medical support device according to claim 2, wherein, in a case in which a region of interest is designated on at least any one of the ultrasound image or the radiation image, the region of interest is displayed at a corresponding position in both the first schema image and the second schema image.

4. The medical support device according to claim 2, wherein the position of the virtual cross section on the second schema image is derived based on the position of the virtual cross section on the first schema and a depth of the virtual cross section in a compression direction in the ultrasound image.

5. The medical support device according to claim 2, wherein the schema image further includes a third schema image, and
the third schema image is an image that shows a third schema as a schematic view of the breast in the radiographic imaging in which an imaging direction is different from an imaging direction in a case of the first schema and that displays a position of the virtual cross section.

6. The medical support device according to claim 5, wherein the position of the virtual cross section on the third schema image is derived based on the position of the virtual cross section on the second schema and a distance of the virtual cross section in the ultrasound image from a body surface of a subject in a front-rear direction.

7. The medical support device according to claim 5, wherein the radiation image includes a first radiation image and a second radiation image obtained in an imaging direction different from an imaging direction of the first radiation image,
the first schema image corresponds to the first radiation image,
the third schema image corresponds to the second radiation image, and
the position of the virtual cross section on the second schema image is derived based on the positions of the virtual cross section on the first schema image and the third schema image.

8. The medical support device according to claim 7, wherein the position of the virtual cross section on the third schema image is displayed based on the ultrasound image.

9. The medical support device according to claim 1, wherein, in the ultrasound image, a first blind area as an image region in which the breast is not imaged in an ultrasound examination is displayed in a form distinguishable from other regions.

10. The medical support device according to claim 1, wherein, in the schema image, a second blind area as an image region in which the breast is not imaged in an ultrasound examination is displayed in a form distinguishable from other regions.

11. The medical support device according to claim 1, wherein the schema image further includes a fourth schema image, and
the fourth schema image is an image that shows a fourth schema as a schematic view showing a state in which the compression member compresses the breast and that displays a position of the virtual cross section.

12. The medical support device according to claim 11, wherein the position of the virtual cross section on the fourth schema image is derived based on the position of the virtual cross section on the ultrasound image.

13. The medical support device according to claim 1, wherein the display image further displays information on a depth of an intersection of the virtual cross sections in a compression direction of the breast.

14. The medical support device according to claim 1, wherein, in a case in which the virtual cross section displayed on the schema image based on the position of the virtual cross section on the ultrasound image is defined as a first virtual cross section,
a display aspect of a position of the first virtual cross section is a display aspect distinguishable from a second virtual cross section that is a virtual cross section estimated based on the position of the first virtual cross section displayed on the schema image and that is displayed on an image different from an image in which the first virtual cross section is displayed.

15. The medical support device according to claim 1, wherein, in a case in which the position of the virtual cross section displayed on the schema image is changed, the virtual cross section after the change has a display aspect distinguishable from the virtual cross section before the change.

16. A medical image capturing system comprising:
the medical support device according to claim 1;
a radiography apparatus; and
an ultrasonography apparatus.

17. A medical support method comprising:
acquiring
an examination image that is an image including a radiation image obtained by performing radiographic imaging of a breast in a state of being compressed by a compression member and a plurality of ultrasound images captured in a state in which the breast is compressed by the compression member in a compressed state regarded as being the same as a compressed state in the radiation image, and that displays a position of a virtual cross section on each of the ultrasound image and the radiation image, and
a schema image including a first schema image as an image that shows a first schema as a schematic view showing the breast in the radiographic imaging and that displays a position of the virtual cross section based on the ultrasound image; and
executing display control of displaying a display image including the examination image and the schema image.

18. A non-transitory computer-readable storage medium storing a program causing a computer to execute a process comprising:
acquiring
an examination image that is an image including a radiation image obtained by performing radiographic imaging of a breast in a state of being compressed by a compression member and a plurality of ultrasound images captured in a state in which the breast is compressed by the compression member in a compressed state regarded as being the same as a compressed state in the radiation image, and that displays a position of a virtual cross section on each of the ultrasound image and the radiation image, and
a schema image including a first schema image as an image that shows a first schema as a schematic view showing the breast in the radiographic imaging and that displays a position of the virtual cross section based on the ultrasound image; and
executing display control of displaying a display image including the examination image and the schema image.

* * * * *